(12) United States Patent
Um

(10) Patent No.: US 8,490,013 B2
(45) Date of Patent: Jul. 16, 2013

(54) METHOD AND APPARATUS FOR SINGLE TOUCH ZOOM USING SPIRAL ROTATION

(75) Inventor: Joo Yong Um, Kunpo (KR)

(73) Assignee: Atmel Corporation, San Jose, CA (US)

( * ) Notice: Subject to any disclaimer, the term of this patent is extended or adjusted under 35 U.S.C. 154(b) by 552 days.

(21) Appl. No.: 12/512,903

(22) Filed: Jul. 30, 2009

(65) Prior Publication Data

US 2011/0029917 A1 Feb. 3, 2011

(51) Int. Cl.
*G06F 3/033* (2006.01)
(52) U.S. Cl.
USPC .......................... 715/800; 715/702; 715/863
(58) Field of Classification Search
USPC ......................................... 715/800, 702, 863
See application file for complete search history.

(56) References Cited

U.S. PATENT DOCUMENTS

| | | | | |
|---|---|---|---|---|
| 7,439,969 | B2 * | 10/2008 | Chithambaram et al. | 345/418 |
| 7,456,849 | B2 * | 11/2008 | Brooke | 345/661 |
| 7,663,607 | B2 | 2/2010 | Hotelling | |
| 7,844,915 | B2 * | 11/2010 | Platzer et al. | 715/781 |
| 7,875,814 | B2 | 1/2011 | Chen | |
| 7,877,707 | B2 * | 1/2011 | Westerman et al. | 715/863 |
| 7,920,129 | B2 | 4/2011 | Hotelling | |
| 8,031,094 | B2 | 10/2011 | Hotelling | |
| 8,031,174 | B2 | 10/2011 | Hamblin | |
| 8,040,326 | B2 | 10/2011 | Hotelling | |
| 8,049,732 | B2 | 11/2011 | Hotelling | |
| 8,154,529 | B2 * | 4/2012 | Sleeman et al. | 345/173 |
| 8,179,381 | B2 | 5/2012 | Frey | |
| 8,219,936 | B2 * | 7/2012 | Kim et al. | 715/862 |
| 2006/0026521 | A1 * | 2/2006 | Hotelling et al. | 715/702 |
| 2006/0232611 | A1 * | 10/2006 | Brooke | 345/671 |
| 2008/0165133 | A1 * | 7/2008 | Blumenberg et al. | 345/173 |
| 2009/0315854 | A1 | 12/2009 | Matsuo | |
| 2010/0315438 | A1 * | 12/2010 | Horodezky et al. | 345/661 |
| 2012/0242588 | A1 | 9/2012 | Myers | |
| 2012/0242592 | A1 | 9/2012 | Rothkopf | |
| 2012/0243151 | A1 | 9/2012 | Lynch | |
| 2012/0243719 | A1 | 9/2012 | Franklin | |

FOREIGN PATENT DOCUMENTS

WO WO 2012/129247 9/2012

OTHER PUBLICATIONS

Olwal, A., Feiner, S., and Heyman, S. Rubbing and Tapping for Precise and Rapid Selection on Touch-Screen Displays. Proceedings of CHI 2008 (SIGCHI Conference on Human Factors in Computing Systems), Florence, Italy, Apr. 5-10, 2008, pp. 295-304.*
U.S. Appl. No. 61/454,936, filed Mar. 21, 2011, Myers.
U.S. Appl. No. 61/454,950, filed Mar. 21, 2011, Lynch.
U.S. Appl. No. 61/454,894, filed Mar. 21, 2011, Rothkopf.

* cited by examiner

*Primary Examiner* — Andrey Belousov
*Assistant Examiner* — Meseker Takele
(74) *Attorney, Agent, or Firm* — Baker Botts LLP

(57) ABSTRACT

A touchscreen display device implements a single touch operation using a spiral rotation gesture on a touchscreen display device to magnify the display of an image. Continued spiral rotations result in continued magnification. A zoom-in or zoom-out operation is implemented by a single touch spiral rotation. In one example, a spiral rotation defining an increasing area has a corresponding action to reduce a display portion of the display screen. Similarly, a spiral rotation defining a decreasing area has a corresponding action to magnify the display portion of the display screen. A floating origin may be used to identify gestures at various positions on a touchscreen display.

15 Claims, 21 Drawing Sheets

US 8,490,013 B2

METHOD AND APPARATUS FOR SINGLE TOUCH ZOOM USING SPIRAL ROTATION

BACKGROUND

User interfaces for computing devices continue to develop and improve as the functionality of computing platforms increases. Touch screens provides a graphic user interface which enhances traditional techniques, such as use of a keyboard, a mouse, and other mechanical input devices. Touch screens provide a method for a user to interact with a computing device, by enabling a user to input control actions and make selections in a more natural and intuitive manner.

A touchscreen is a display which can detect the presence and location of a touch within the display area. The term generally refers to touch or contact to the display of the device by a finger or hand. The touchscreen display responds to passive objects as well, such as a stylus or pen. Touchscreens provide a direct interface for a user, and may perform a predefined operation in response to a specific type of touch or motion.

Some touchscreen displays provide a separate menu to select a zoom-in or a zoom-out action. The menu may have at least one selection button for zoom-in and at least one selection button for zoom-out. Other touchscreen displays may have a sliding bar type selection mechanism. Touchscreen display devices may accept and recognize a variety of inputs. In one example, the touchscreen display device includes multiple keys, which are displayed on a touch surface. The keys provide input positions for user input, a touch sensor identifies touches to the display surface and identifies a corresponding action. Some touchscreen displays are able to interpret a wide range of inputs, wherein a gesture applied at any position on the display screen corresponds to an action. For example, a gesture drawing a line in a direction implements a page up or page down action.

DETAILED DESCRIPTION

The following is a detailed description of embodiments of method and apparatuses for single touch operations using a spiral rotation gesture on a touchscreen display device. Some embodiments may implement a variety of actions in response to various gestures.

Some embodiments are applicable to a cell phone, or other small screen device, such as a Personal Digital Assistant, electronic book reader, GPS, and so forth. In such devices, the display and touch screen is adapted for a single touch selection, which users may find more convenient than two finger selection techniques. The ability to implement a zoom or other function using just one finger, stylus or touch apparatus enables a user to implement actions in a manner consistent with the size of the device.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media such as memory or other type of storage devices. Further, such functions correspond to modules, which are software, hardware, firmware or any combination thereof. Multiple functions may be performed in one or more modules as desired, and the embodiments described are merely examples. The software may be executed on a digital signal processor, Application Specific Integrated Circuit (ASIC), microprocessor, or other type of processor operating on a computer system, such as a personal computer, server or other computer system.

Figure 1:
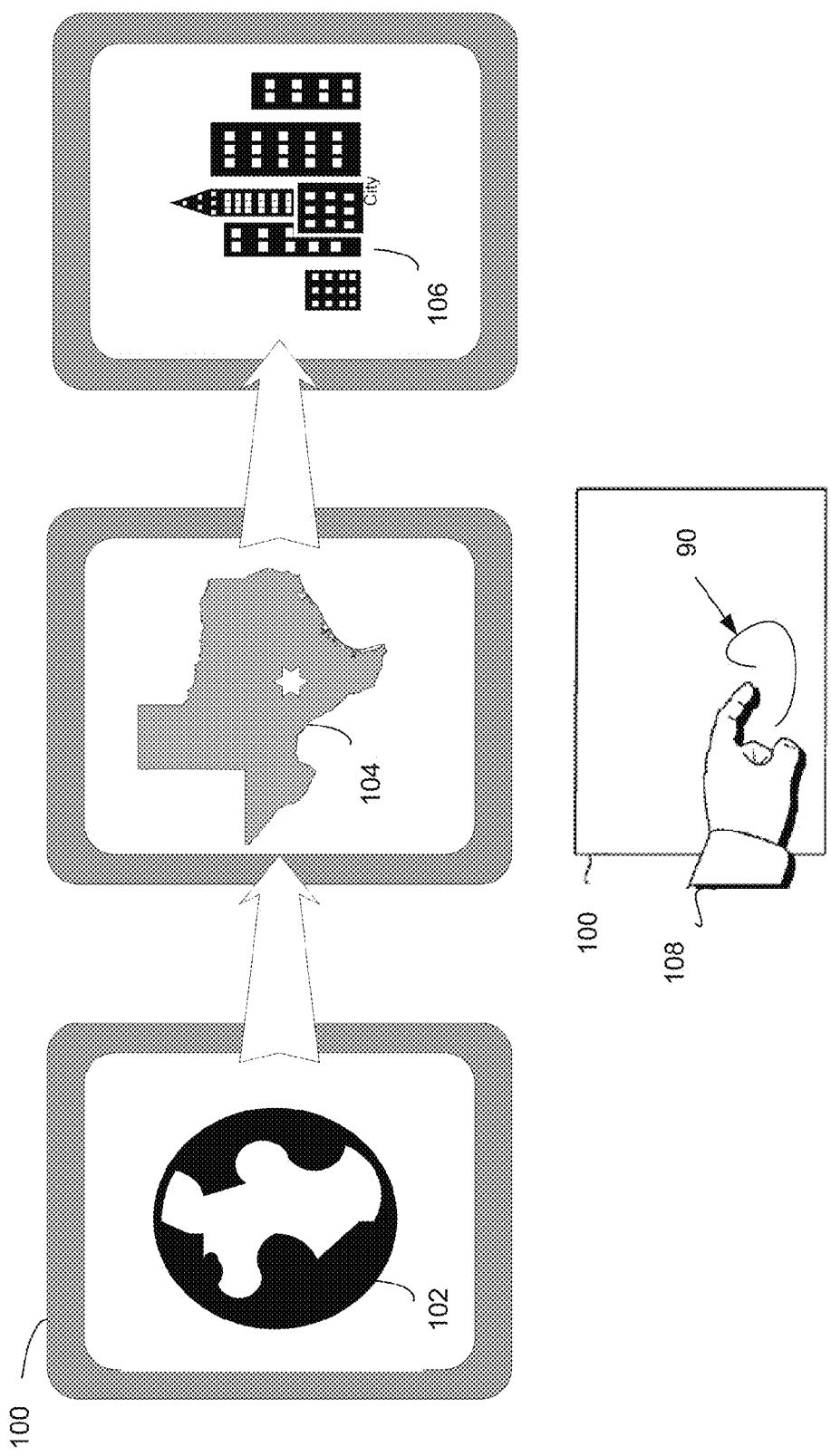
FIG. 1 is a block diagram illustrating a gesture activated touchscreen display, according to an example embodiment.

FIG. 1 illustrates a display device 100 implementing a single touch operation in response to a spiral rotation gesture. A hand 108 may make a spiral rotation gesture 110 on a touch surface of the display device 100. In response to the spiral rotation gesture 110, the display device 100 determines an action, such as to magnify the display of an object. The action taken will be a function of the spiral rotation gesture 110, such as the direction, the size or shape of the gesture 110. Some embodiments may implement a variety of actions in response to various gestures. Examples are provided in the following discussion.

In one example, at a first time the touchscreen display device 100 displays text or an image or object such as a globe 102. The globe 102 is displayed on the touch surface of the display device 100. The display device 100 implements a single touch operation using a spiral rotation gesture 110 on a touchscreen display device 100 to magnify the display of an image, such as the globe 102. Continued spiral rotations result in continued magnification from the globe 102 to view the geographical state 104, and further to view a city 106 within the state 104.

To implement a single touch operation or control, the touchscreen display 10 may recognize a variety of touches, each associated with a corresponding action. In one example, the touchscreen display 10 recognizes a spiral rotation. The spiral rotation may approximate a spiral defined by one of various equations, wherein each point on the gesture has a radial measure with respect to a point on the touchscreen display. The radial measure may then be used to determine an angular measure from a starting point of the gesture. In one example, the spiral rotation may approximate a logarithmic spiral defined as:

$$r = a * e^{b\theta} \quad (1)$$

wherein r is the radius of a point on the spiral, a and b are constants and $\theta$ is the polar angle measured from an axis containing the origin and a start point. In this way, each point on the gesture has a corresponding radial measure r with respect to the origin. When the radial measures of the gesture are increasing, the display device will take action to decrease the display size of the image, or zoom-out. When the radial measures of the gesture are decreasing, the display device will take action to increase the display size of the image, or zoom-in.

A spiral rotation defining a decreasing circular area results in a magnification of the displayed image or portion of the display screen. Some embodiments may have a first action corresponding to a rotation in a first direction, such as a clock-wise direction, and a second action corresponding to a rotation in a second direction, such as a counter-clock-wise direction.

Examples of operation of the display device 100 according to various embodiments are described in FIGS. 2-10. A detailed view of the display device 100 is provided in FIG. 2, wherein a display surface 200 has a center point O 202 at the intersection of a midpoint on the horizontal axis with a midpoint on the vertical axis. A user makes a gesture 220 which begins at a start point S 204 and continues to a finish point F 206. The start point S 204 is a radial distance $d_1$ from the center point O 202. The finish point F 206 is a radial distance $d_2$ from the center point O 202. For the gesture 220, a spiral rotation covers an increasing area, wherein the point F 206 is farther from a center point O 202, than the point S 204.

In one embodiment, the display device 100 determines center point O 202 using the following equations:

$$\text{Basic\_origin } x_O = \text{Screen\_Max\_}X/2, \quad (2)$$

$$\text{Basic\_origin } y_O = \text{Screen\_Max\_}Y/2 \quad (3)$$

Figure 2:
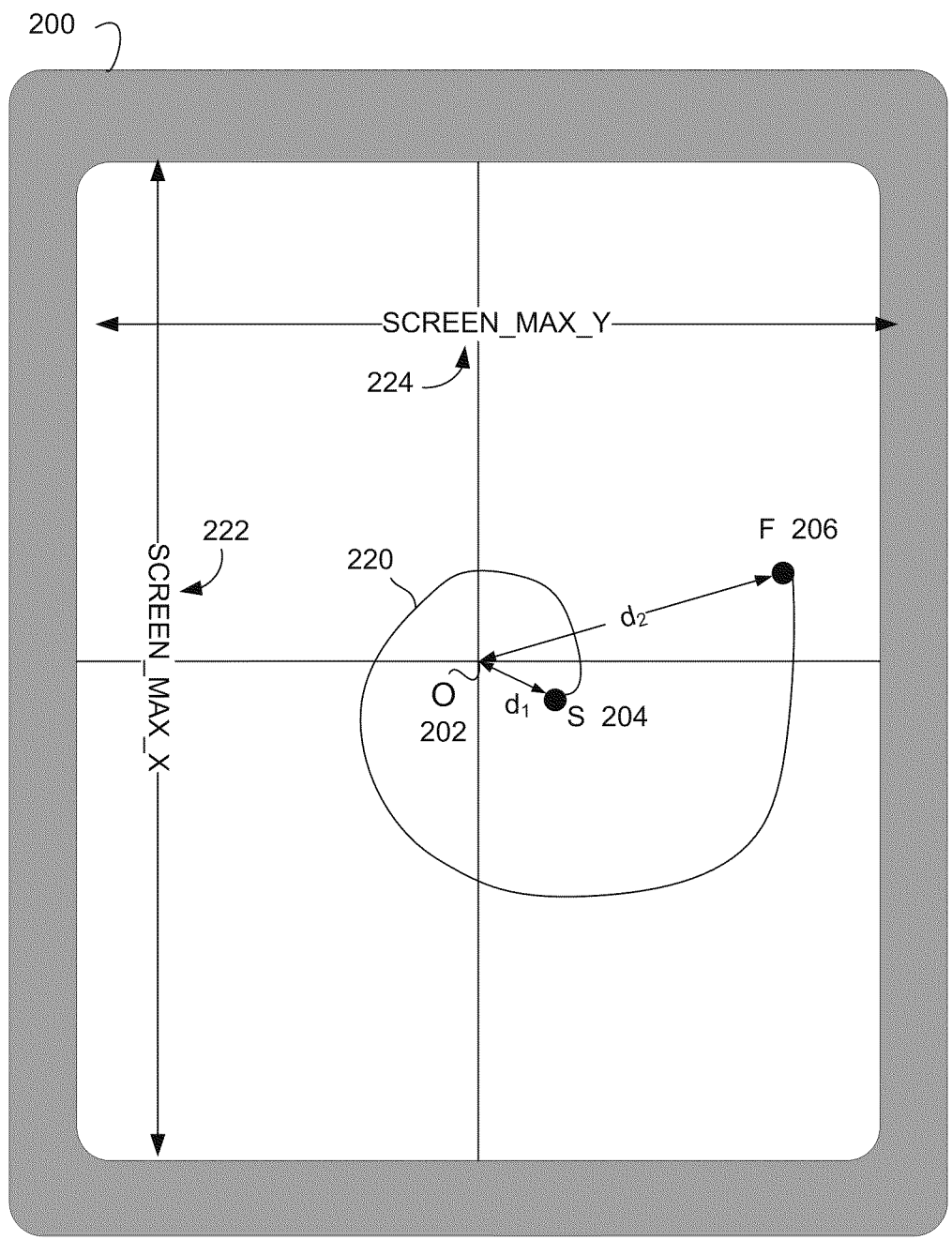
FIG. 2 is a block diagram illustrating a gesture applied to a touchscreen display device, according to an example embodiment.

Screen_Max_X 224 is illustrated as the horizontal measurement of the display surface 200. Screen_Max_Y is illustrated as the vertical measurement of the display surface 200. Other embodiments may use other measurement values or other orientations to identify the origin. As illustrated in FIG. 2, in some embodiments the origin or center point O 202 is in a physically static location based on the dimensions of the touch surface of the display surface 200. The center point is identified by coordinates ($x_O$, $y_O$). On detection of the gesture 220, a method calculates a distance to the start point S 204. When the point S is identified by coordinates ($x_S, y_S$), the distance is given as:

$$d_1 = |(x_S, y_S) - (x_O, y_O)|. \quad (4)$$

The gesture 220 has a final point F 206, identified by coordinates ($x_F, y_F$). The method calculates a distance, $d_2$, to the center point O 202, which is given as:

$$d_2 = |(x_F, y_F) - (x_O, y_O)|. \quad (5)$$

The distances are compared to identify if the gesture 220 is defining an increasing area or a decreasing area. The gesture 220 of FIG. 2 defines an increasing area, and therefore, results in magnification of a displayed object.

Figure 3:
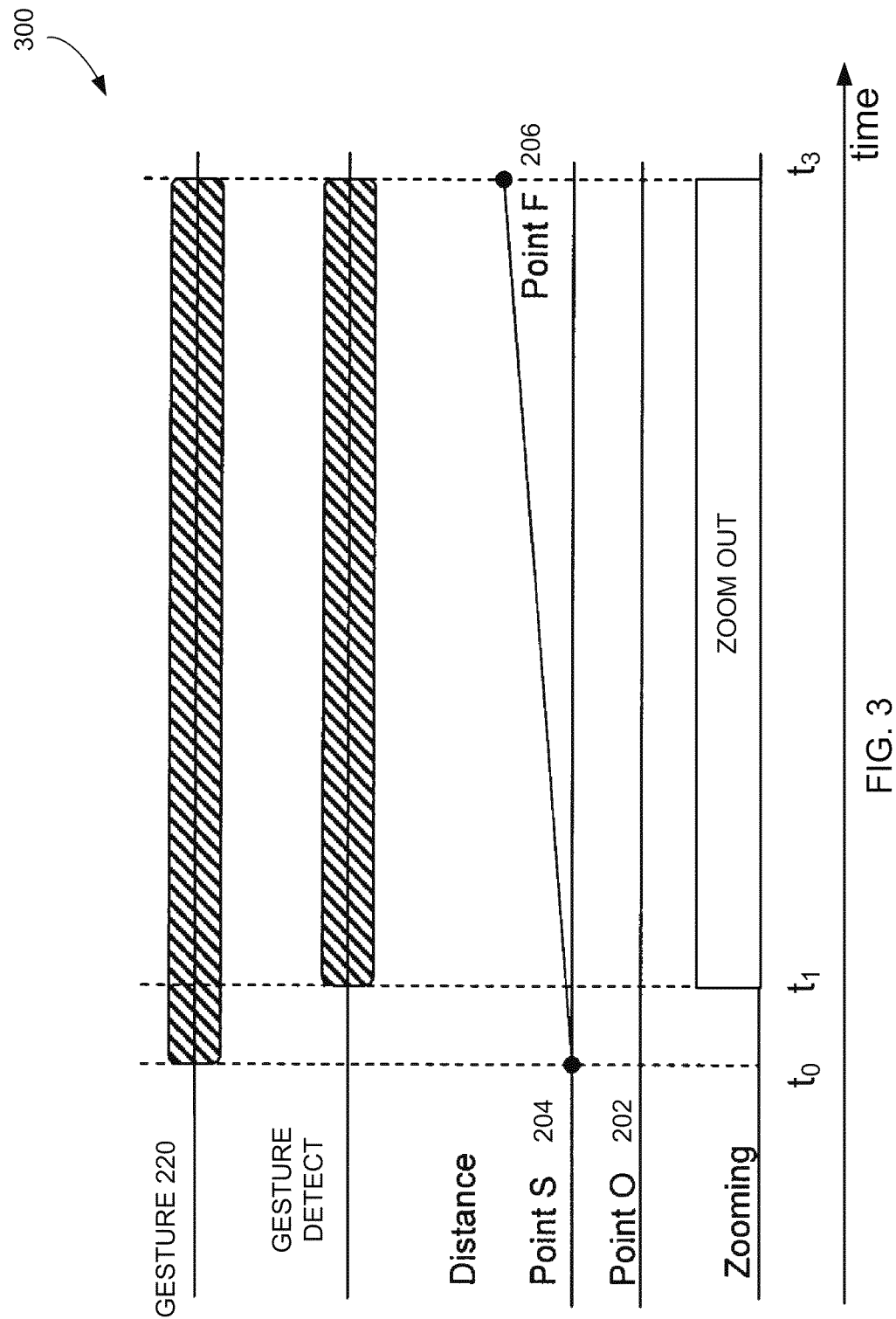
FIG. 3 is a signal flow diagram illustrating a spiral gesture applied to a touchscreen display device and a corresponding action, according to an example embodiment.

FIG. 3 is a timing diagram 300 illustrating the resultant actions taken in response to gesture 220 of FIG. 2. The horizontal axis of FIG. 3 represents time, wherein the gesture 220 starts at time $t_0$ and continues to time $t_2$. At time $t_1$ the gesture 220 is detected by the display device. The diagram 300 plots the distance of the gesture 200 from the origin O 202 (FIG. 2). As illustrated, the distance between the origin O 202 and the gesture 220 continues to increase, such that the point F 206 is farther from the origin O 202 than the point S 204. The lower portion of the diagram 300 identifies the resultant action to zoom-out of the displayed object. In other words, the size of the displayed object is reduced.

Figure 4:
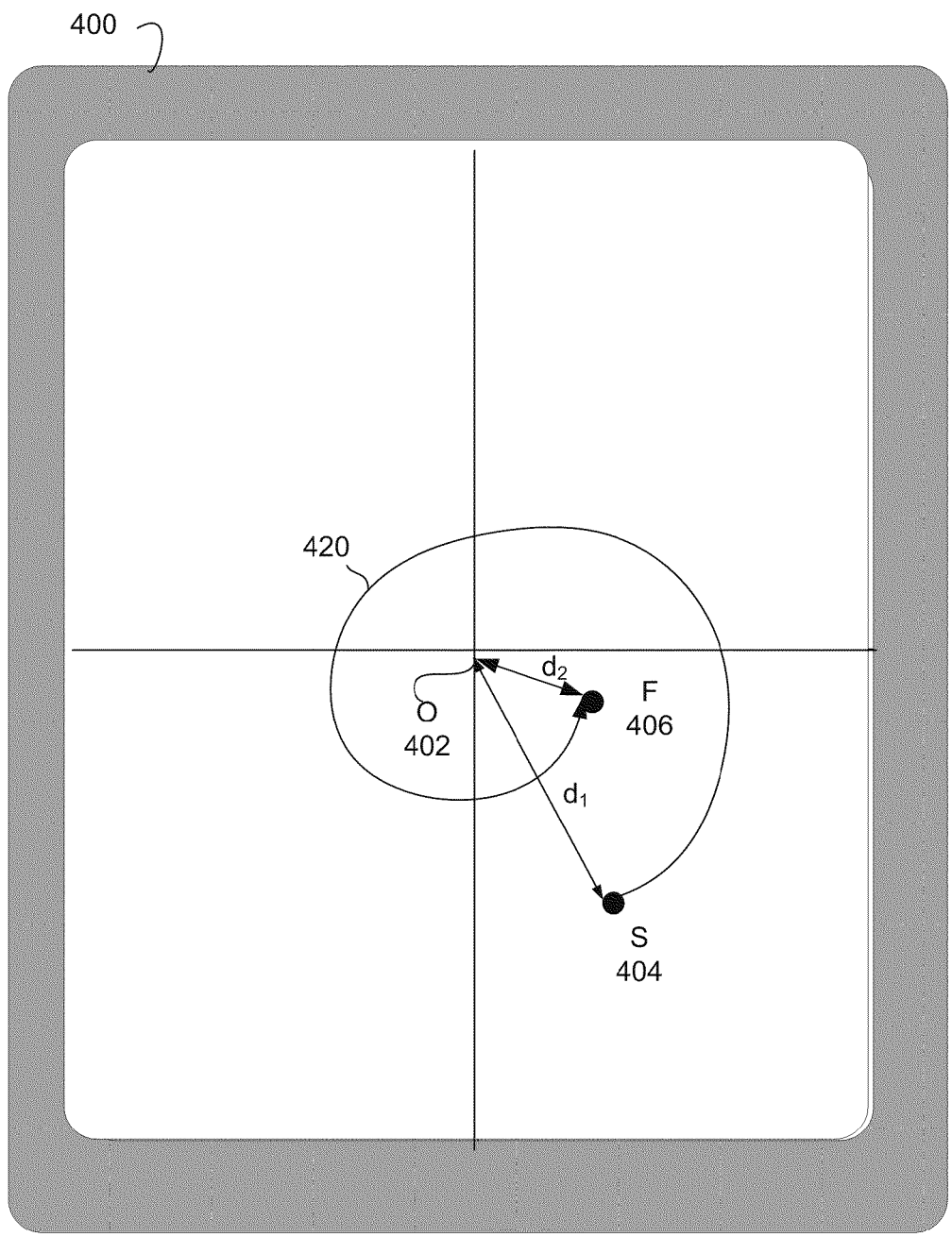
FIG. 4 is a block diagram illustrating a gesture applied to a touchscreen display device for a zoom-out action, according to an example embodiment.

FIG. 4 is a detailed view of a display surface 400 for a display device 100 (FIG. 1). The display surface 400 has a center point O 402 at the intersection of a midpoint on the horizontal axis with a midpoint on the vertical axis. A user makes a gesture 420, which begins at a start point S 404 and continues to a finish point F 406. The start point S 404 is a radial distance $d_1$ from the center point O 402. The finish point F 406 is a radial distance $d_2$ from the center point O 402. For the gesture 420, a spiral rotation covers a decreasing area, wherein the point F 406 is closer to a center point O 402, than the point S 404.

In one embodiment, on detection of the gesture 220, the method calculates the distances $d_1$ and $d_2$ according to Equations (2) through (5) above. The distances are compared to identify if the gesture 220 is defining an increasing area or a decreasing area. The gesture 420 of FIG. 4 defines a decreasing area, and therefore, results in reduction of a displayed object.

Figure 5:
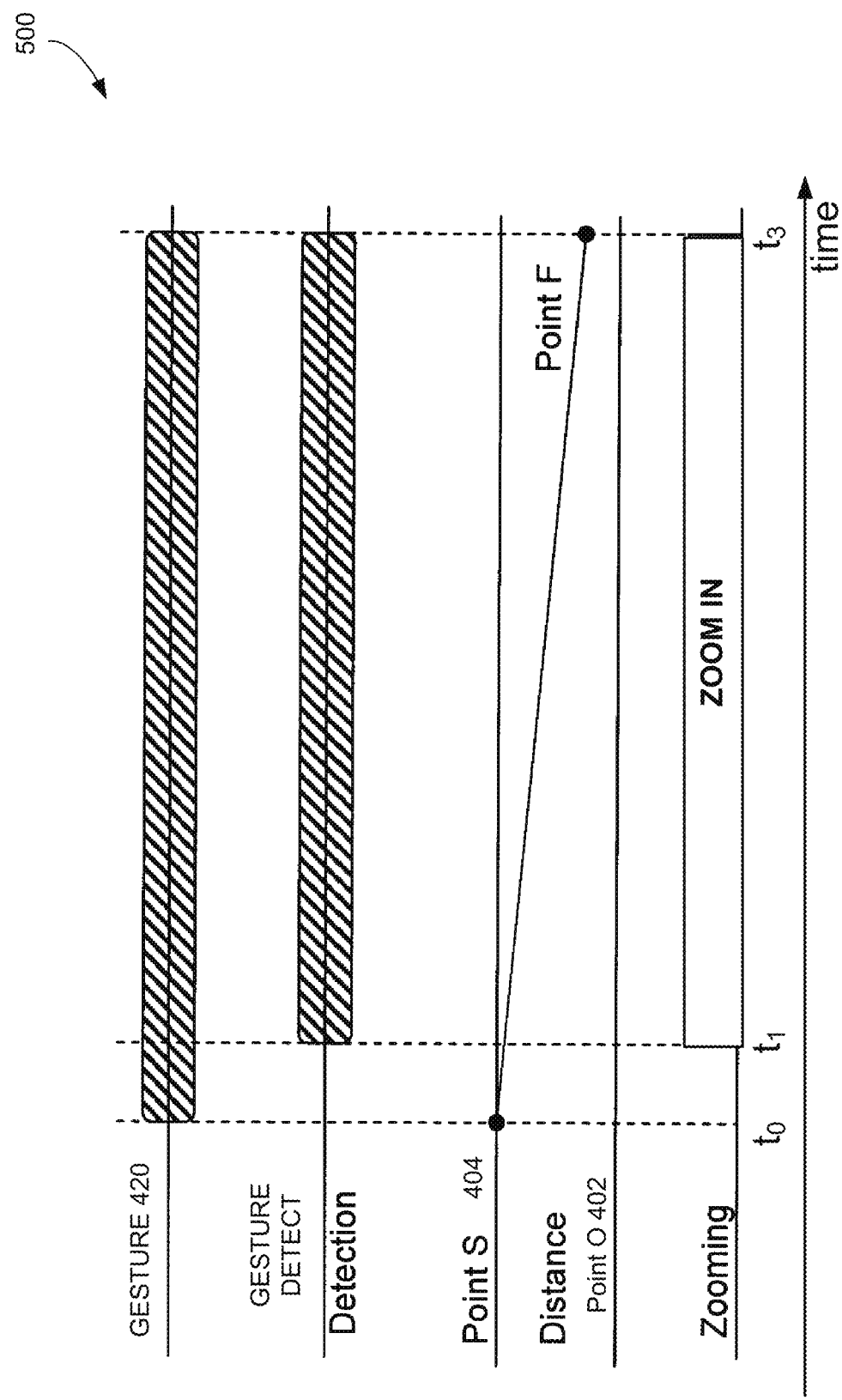
FIG. 5 a signal flow diagram illustrating a spiral gesture applied to a touchscreen display device and a corresponding action, according to an example embodiment.

FIG. 5 is a timing diagram 500 illustrating the resultant actions taken in response to gesture 420 of FIG. 4, where the gesture 420 starts at time $t_0$ and continues to time $t_3$. At time $t_1$ the gesture 420 is detected by the display device. The diagram 500 plots the distance of the gesture 400 from the origin O 402 (FIG. 2). As illustrated, the distance between the origin O 402 and the gesture 420 continues to decrease, such that the point F 406 is closer to the origin O 402 than the point S 404. The lower portion of the diagram 500 identifies the resultant action to zoom-in on the displayed object. In other words, the size of the displayed object is magnified.

Figure 6:
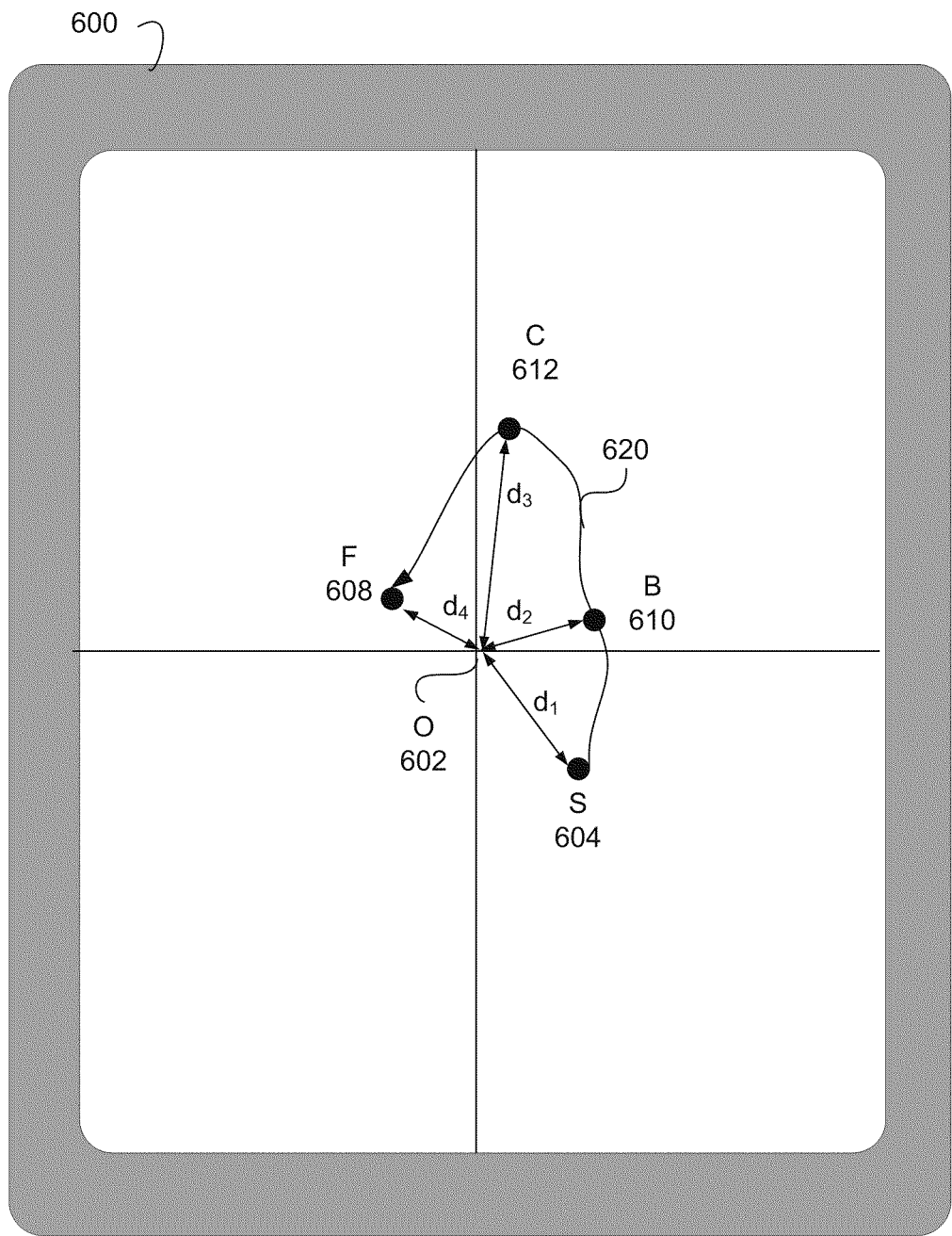
FIG. 6 is a block diagram illustrating a gesture applied to a touchscreen display device, according to an example embodiment.

In some embodiments, a display device responds over time to a received gesture. An example is illustrated in FIG. 6, detailing actions seen on a display surface 600. The gesture 620 is illustrated from start point S 604 through point B 610 and point C 612 to point F 608. For each point a distance is measured from the point O 602. The distance $d_1$ is measured to point S 604, the distance $d_2$ is measured to point B 610, the distance $d_3$ is measured to point C 612, and the distance $d_4$ is measured to point F 608. The points B 610 and C 612 correspond to points of the gesture 620. These points are identified on the diagram 700 of FIG. 7, wherein point C 612 identifies a point where the distance between the gesture 620 and the origin point O 602 changes. In response, the action applied to the displayed object changes, such as to magnify or reduce the displayed image. As illustrated:

$$d_2<d_1 \tag{6}$$

$$d_2<d_3 \tag{7}$$

$$d_4<d_3 \tag{8}$$

At each point B, C and F, the distance from the origin O 602 is determined and compared to the distance of the previous point. When the distance from the origin O 602 to the gesture 620 increases from one point to a next, the response action is to reduce the display or zoom-out. When the distance decreases from one point to a next, the responsive action is to magnify the display or zoom-in.

Figure 7:
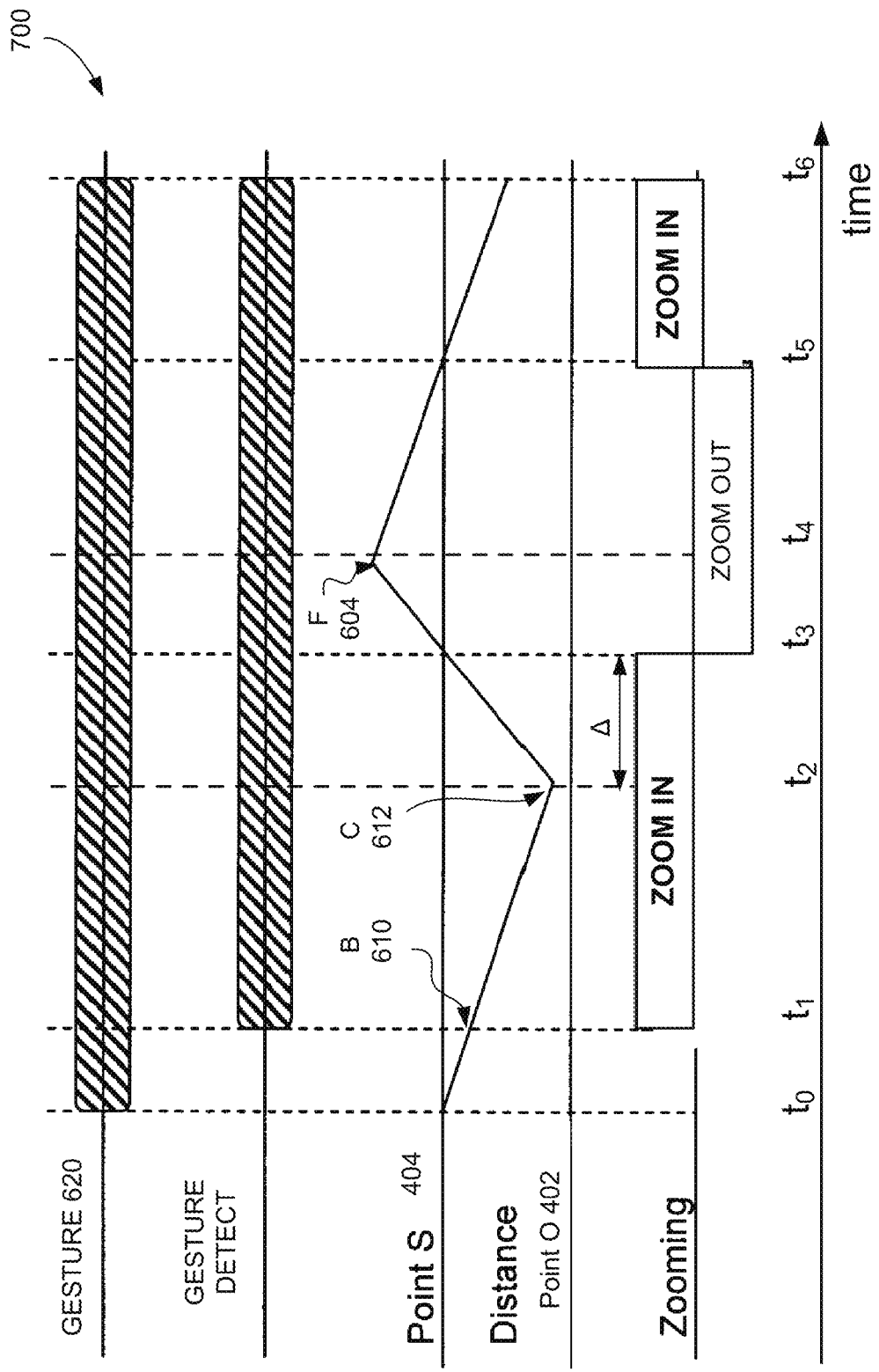
FIG. 7 a signal flow diagram illustrating a spiral gesture applied to a touchscreen display device and a corresponding action, according to an example embodiment.

As illustrated in FIG. 7, the gesture 620 is applied at time $t_0$. The display device detects the gesture 620 at time $t_1$, at which point the action to zoom-in is initiated. The decision to zoom-in or zoom-out is based on whether the distance to the origin O 602 is increasing or decreasing. As illustrated from time $t_1$ to $t_2$ the distance is decreasing and therefore the responsive action is to magnify the image displayed on the display screen 600. Point B 610 corresponds to the time $t_1$, and the distance $d_2$ between the gesture 620 and the origin O 602 at point B 610 is less than the distance $d_1$, and therefore the display device continues to zoom-in on the displayed image. At point C 612, time $t_2$, the distance between the gesture 620 and the origin O 620 has increased, such that the distance $d_3$ is greater than the $d_2$. The increased distance results in a change in action from magnifying an image to reducing the image. There is a delay $\Delta$ before the responsive action starts at time $t_3$. At this time, the display device begins to zoom-out, or reduce, the image displayed on the display surface 600. At time $t_4$ the gesture 620 has again moved closer to the origin O 602, and at point F 604 the distance $d_4$ is less than the distance $d_3$, and resulting in a responsive action to again zoom-in on the displayed image. At time $t_5$ the display device zooms in on the image.

There are a variety of timing schemes that may implemented, such as to monitor a gesture continuously so as to reduce any delay $\Delta$ before implementing a responsive action. In some embodiments, the rate of the magnification over time or the reduction over time corresponds to the relative position of the gesture with respect to previous positions. For example, the gesture may move rapidly from close to the origin to a position far from the origin. In this case, the responsive action will result in an increased reduction of the image displayed on a display surface.

Some embodiments also adjust and control the responsive action as a function of the speed at which the gesture is drawn on the screen. In these embodiments, a rapid motion to make the gesture on the display screen will result in a greater reduction or magnification of an image, than when the gesture is made at a more leisurely pace.

Figure 8:
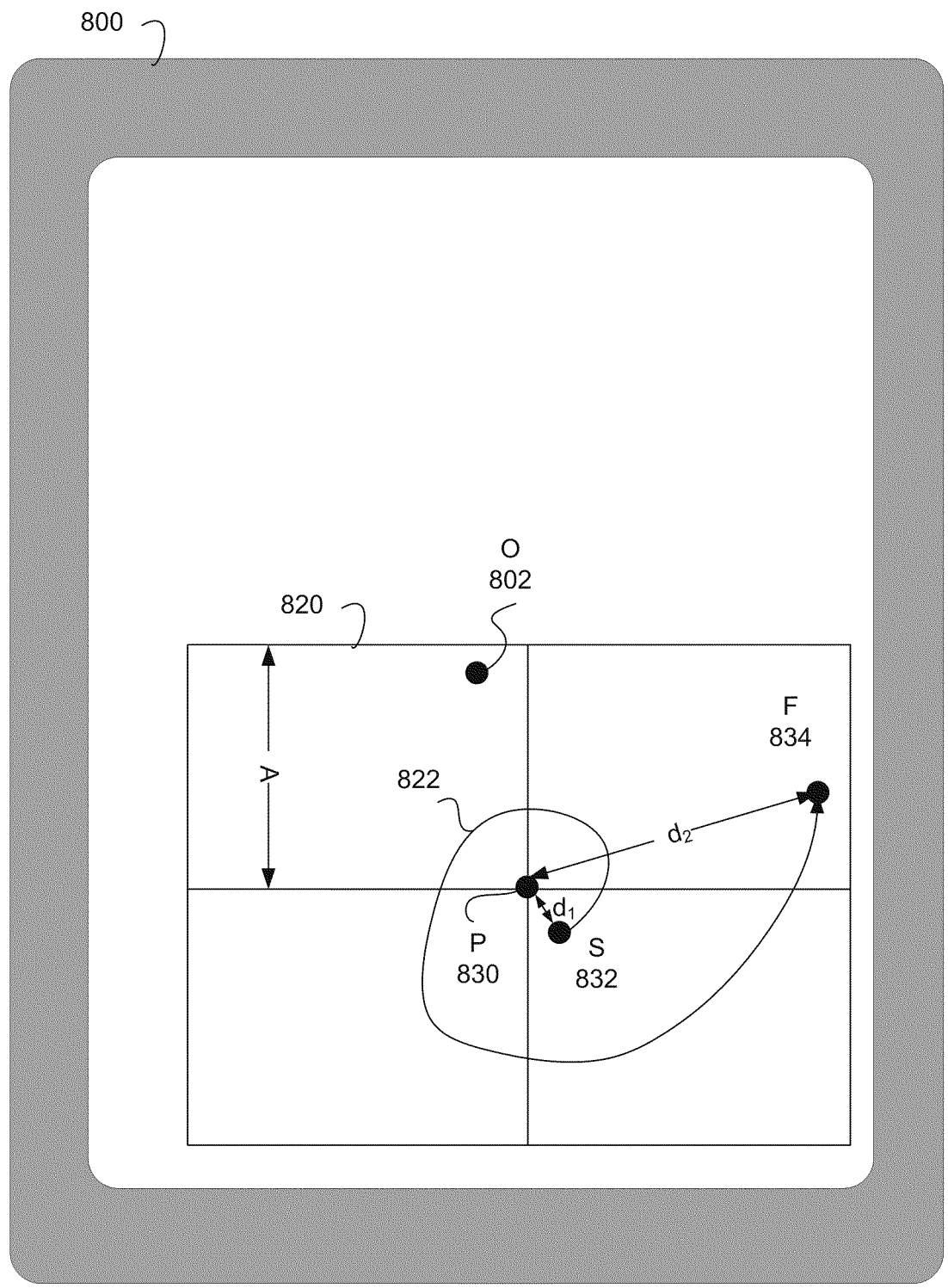
FIG. 8 is a block diagram illustrating a gesture applied to a touchscreen display device, according to an example embodiment.

According to some embodiments, a method adjusts the origin to the start position and shape of a gesture. For example, as illustrated in FIG. 8, the display surface 800 has an identified area 820 in which a gesture 822 is made. The gesture 822 starts at a start point S 832 and continues to an end point F 834. When the display device detects the gesture 822, the display device starts monitoring and tracking positions of the gesture. As illustrated, the gesture is not proximate or centered around the origin O 802. A floating origin is calculated as point P 830. The display device determines the boundaries of the area 820 and a measure A, from which is half the height of the area 820. The area 820 is defined by the coordinates (Ax1, Ay1), (Ax2, Ay2).

The floating origin P 830 is determined according to the following:

$$\text{Floating origin } Px=(Ax2-Ax1)/2, \tag{9}$$

$$\text{Floating origin } Py=(Ay2-Ay1)/2, \tag{10}$$

The display device calculates the distances from the floating origin P 830 to the gesture 822. Once the position of the floating origin P 830 is identified, the position is maintained for the gesture 830. The display device responds to the gesture 830 by either magnifying or reducing the portion of the displayed image corresponding to the area 820. In one embodiment, only the area 820 is changed in response to gesture 822, wherein the remainder of the displayed image is not changed. In some embodiments, the entire display is magnified at a same rate, wherein the image portion corresponding to the position of the floating origin 830 is maintained, such that the image appears to magnify around a constant point.

Figure 9:
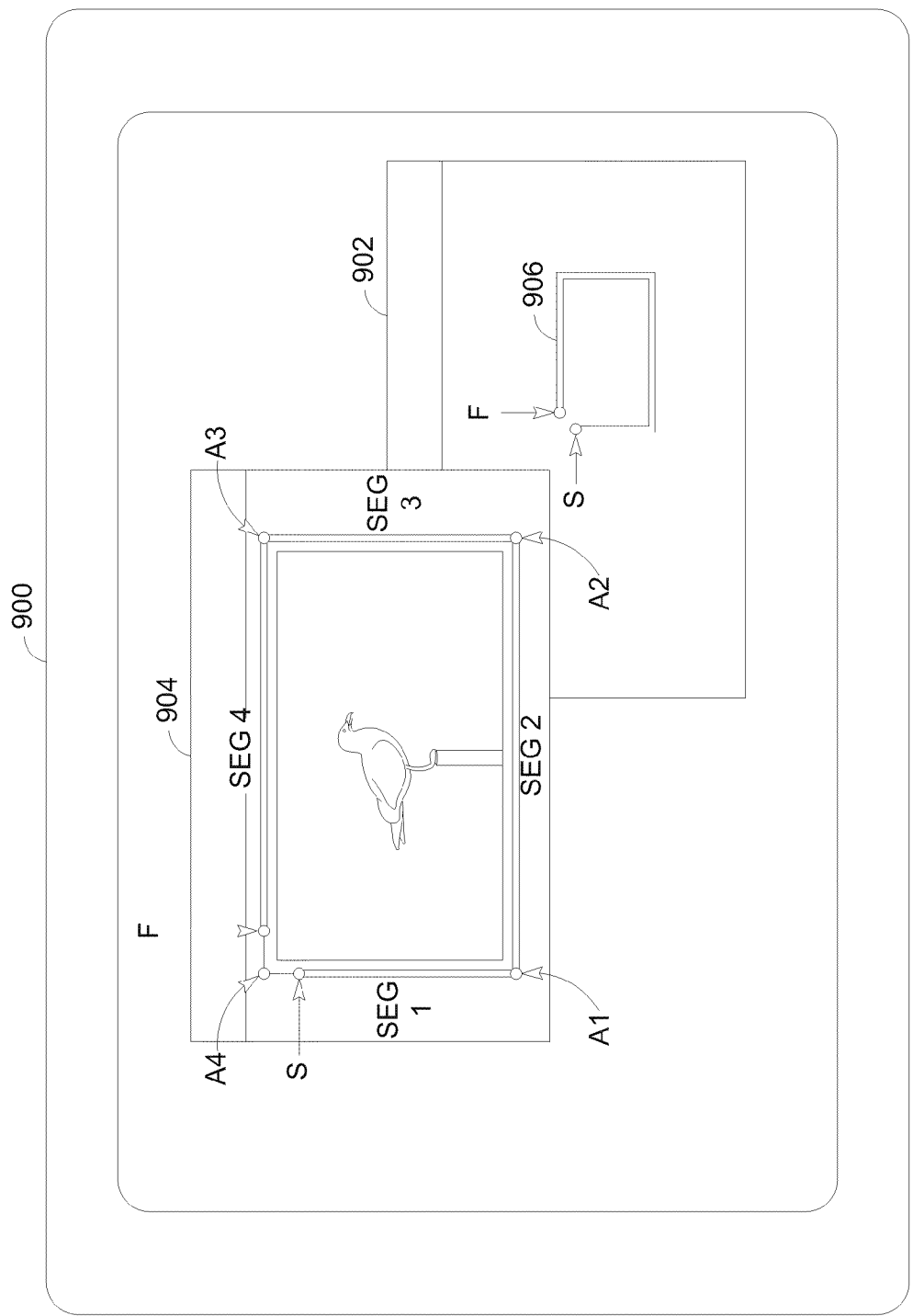
FIG. 9 is a block diagram illustrating a method for processing a gesture applied to a display device, according to an example embodiment.

FIG. 9 is a block diagram illustrating a method for processing a gesture applied to a display device, according to an example embodiment. As illustrated, a window 902 is displayed on a display device 900. A user makes a gesture on the display device defining an area 906. The gesture starts at the start point identified as S, and ends at the finish point, identified as F. The gesture substantially defines an area to be magnified or reduced. In the example illustrated, the rectangular area 906 is magnified in window 904. As illustrated, the gesture defined the sides of the area 906 as linear segments, SEG 1, SEG 2, SEG 3, and SEG 4. In the illustrated example, on the touch event of the gesture from point S to point F, the touch sensor identifies the coordinates of the gesture. The area 906 is magnified to display as window 904, defined as a rectangle having corners, A1, A2, A3 and A4.

Figure 10:
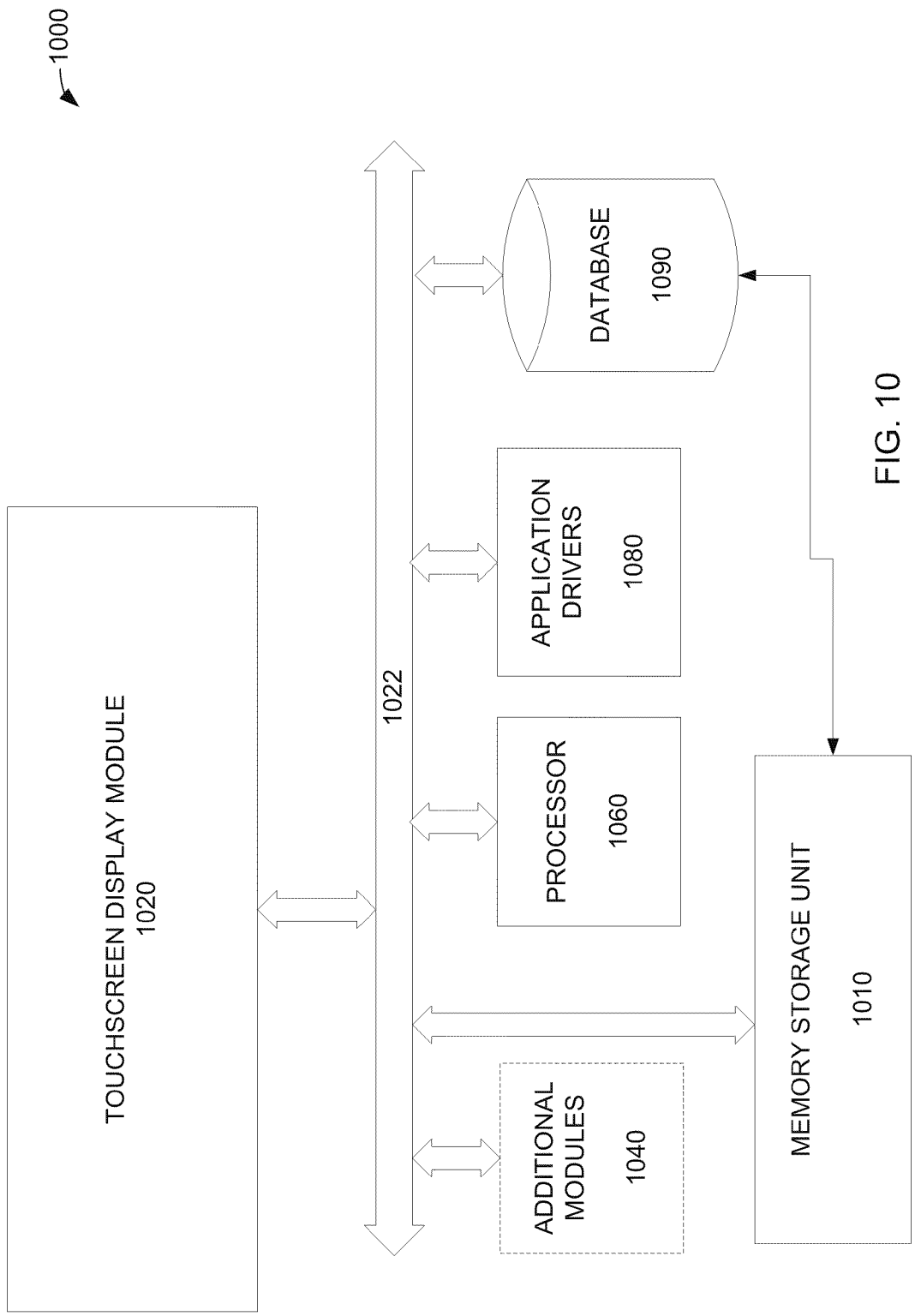
FIG. 10 is a block diagram of a display device, according to an example embodiment.

FIG. 10 is a block diagram of a computing system 1000, including a processor 1060 controlling a touchscreen display module 1020 through a bus 1022. The touchscreen display module 1020 implements a single touch zoom method enabling display control of a display surface. The touchscreen display module 1020 may be any of a variety of touchscreen displays working on a touch sensor (not shown). The single touch zoom method is applicable to any of a variety of touch sensors, which are able to detect multi-dimensional touch gestures. The computing system 1000 includes a database 1000 and a memory storage unit 1010, each for storing information for use within the computing system 1090 and the touchscreen display module 1020. The computing system 1000 also includes application drivers 1080, which include drivers for interfacing with and controlling the touchscreen display module 1020. In some embodiments, the computing system 1000 is made of separate components, which communicate through a wired or wireless communication path. The control mechanisms to implement the single touch zoom method may be stored in the memory storage unit 1010 as instructions to be operated on by the processor 1060.

Figure 11:
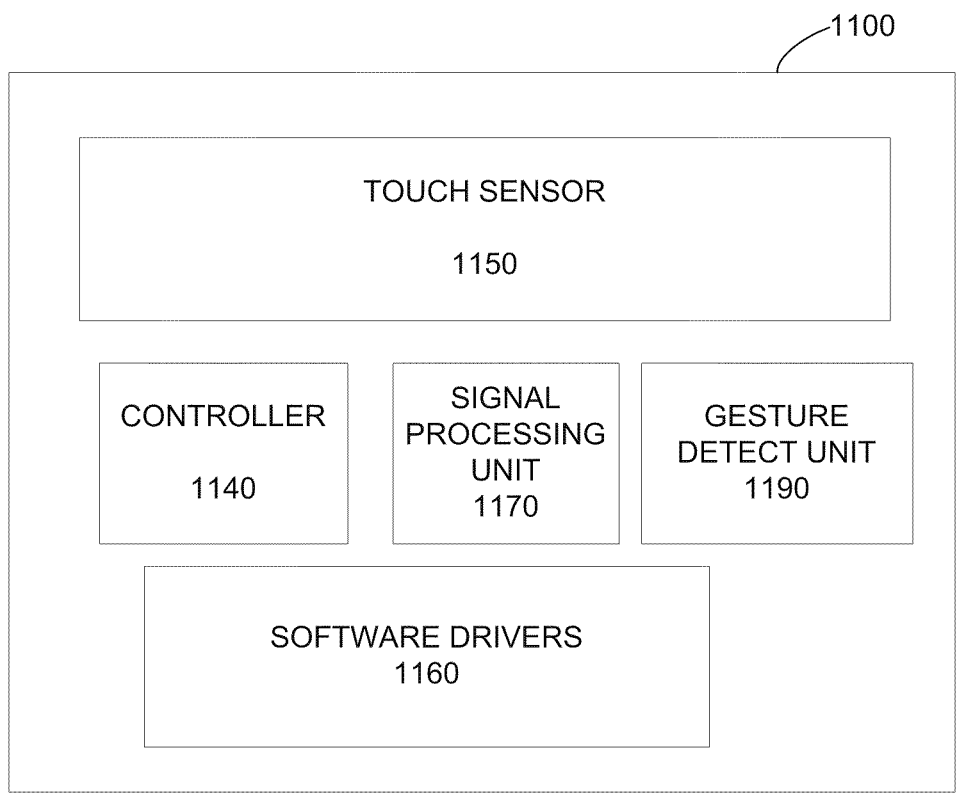
FIG. 11 is a block diagram illustrating a touchscreen display module, according to an example embodiment.

FIG. 11 illustrates an embodiment of a touchscreen display module 1100 which includes a controller 1140, a signal processing unit 1170 and software drivers 1160. The components of the touchscreen display module 1100 are to implement the functions of displaying an image. The touchscreen display module 1000 further includes a touch sensor 1150 having a display surface which acts as a touch surface. Gestures and touches are applied to the touch sensor and interpreted according to the location and motion of the touch. In one embodiment, the touchscreen display module 1100 includes a gesture detect unit 1190 to identify a gesture and interpret into a corresponding action. For example, in the examples discussed above, the gesture detect unit 1190 identifies a spiral rotation, assigns an origin location, calculates distances between the gesture and the origin, and determines an action responsive to the gesture. The gesture detect unit 1190 may include hardware, such as an ASIC, to perform at least some of the functionality to detect a gesture and interpret the gesture to a responsive action. The gesture detect unit 1190 may further include software or firmware to implement operations.

The gesture detect unit 1190 may also receive instructions from components within computing system 1000 of FIG. 10, such as to implement user options. In one embodiment, a user may select options related to gestures and corresponding actions. For example, a user option may be to set a clockwise rotation to indicate a first action and set a counter-clockwise rotation to indicate a second action. A variety of options may be implemented.

Figure 12:
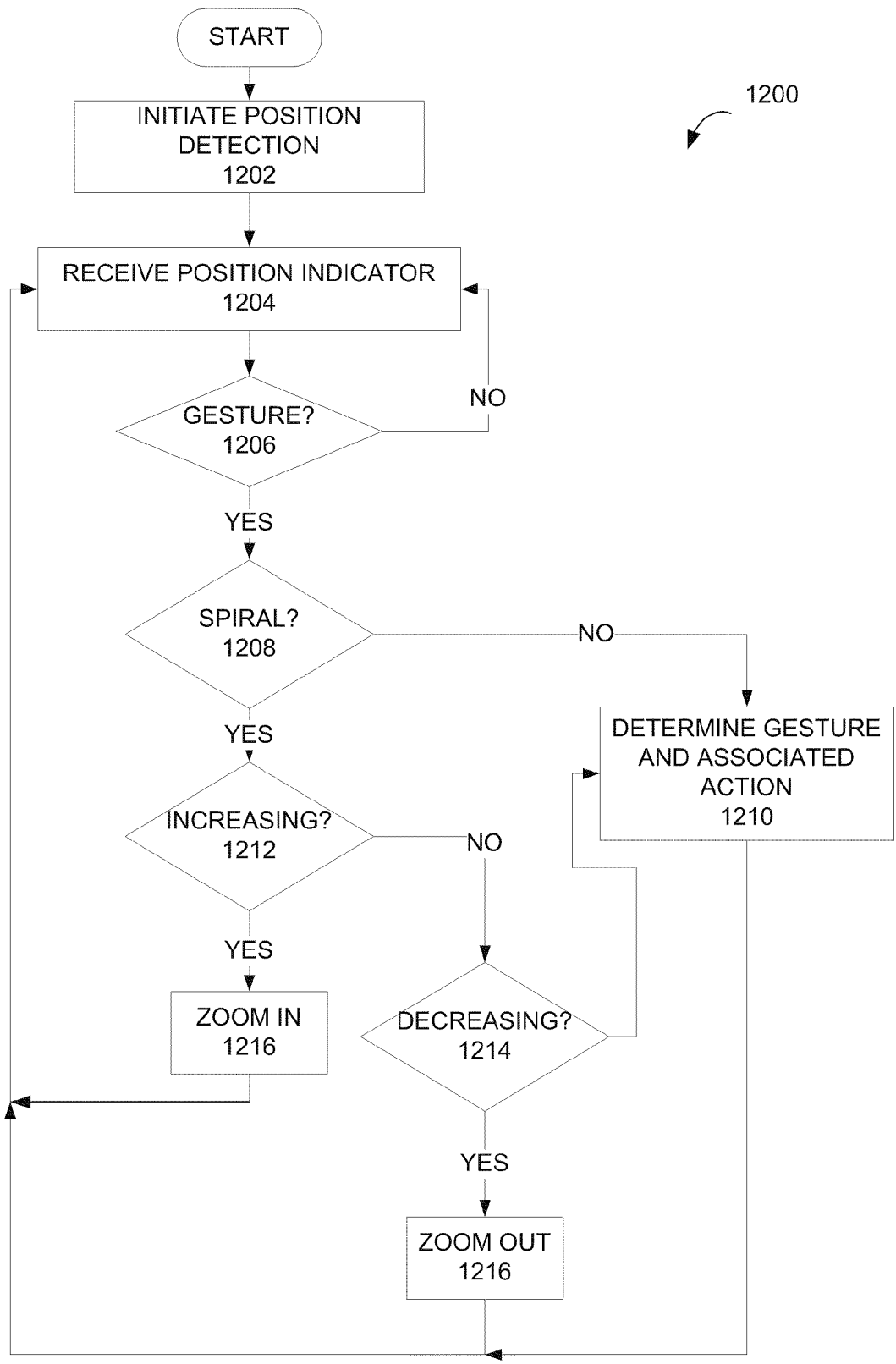
FIG. 12 a flow diagram illustrating a method for a single touch zoom control technique, according to an example embodiment.

FIG. 12 is a flow diagram illustrating a method 1200 for single touch zoom control. A display device, such as display device 100 of FIG. 1, initiates 1202 position detection to detect touches and gestures to a touchscreen display. The display device then receives 1204 a position indicator. When the position indicator is a gesture 1206, processing continues to determine 1208 if the gesture is a spiral. Else processing returns to receive 1204 a next position indicator. When the gesture is a spiral, the method 1200 continues to determine 1212 if the spiral defines an increasing area the display device zooms out 1216 to reduce the scale of the image displayed on the touchscreen display module, and processing returns to receive 1204 a next position indicator. When the spiral does not define an increasing distance between an origin and a current touch point, the method 1200 continues to determine 1214 if the spiral defines a decreasing distance between the origin and the current touch point, and if so zooms in 1218. When the spiral gesture is not increasing and is not decreasing, processing continues to determine 1210 the gesture and associated action.

Figure 13:
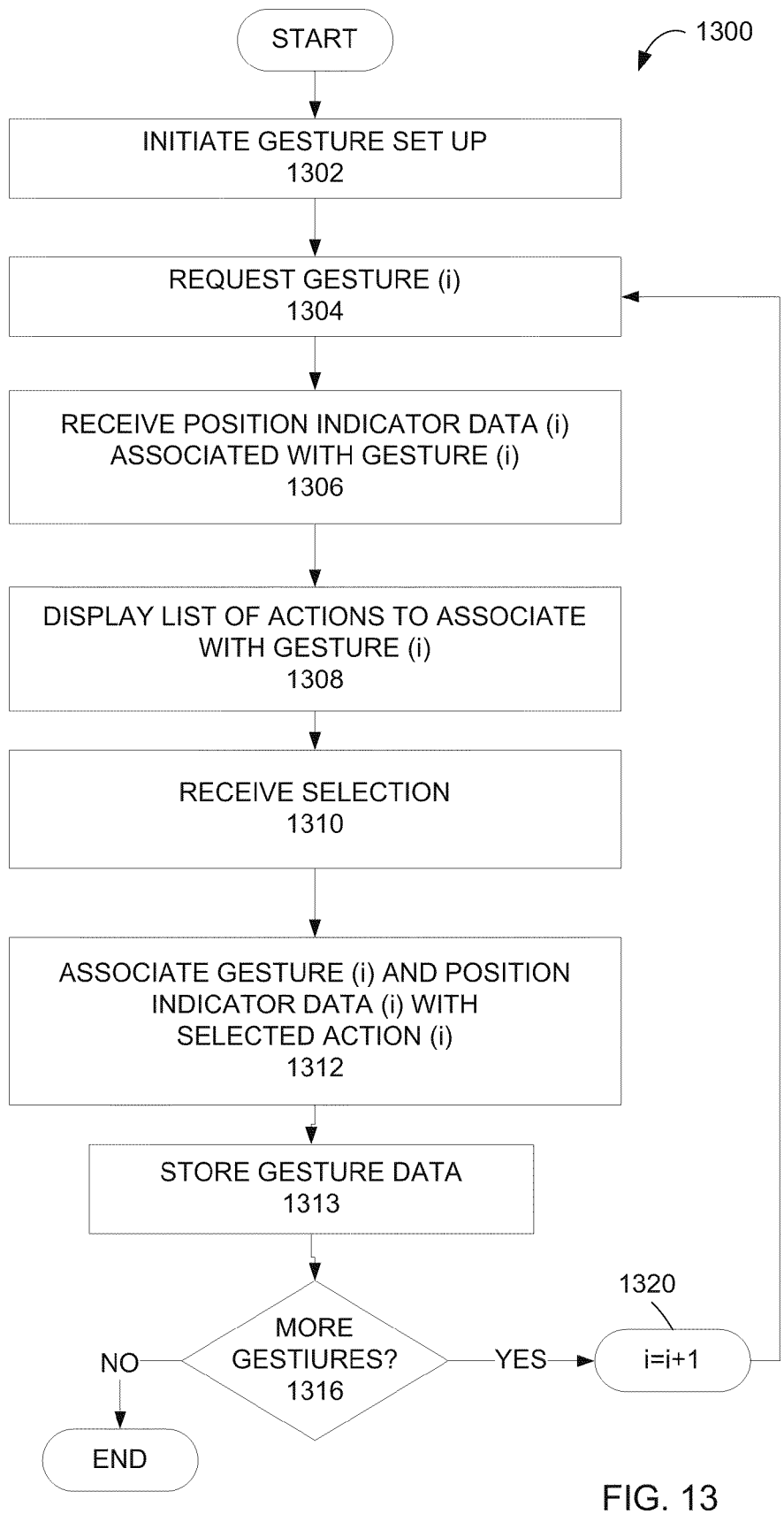
FIG. 13 is a flow diagram illustrating a method to set up gesture controls, according to an example embodiment.

FIG. 13 is a flowchart illustrating a method 1300 for setting up gestures and actions in a single touch zoom, including a spiral rotation gesture according to an example embodiment. The method 1300 includes actions to initiate 1302 gesture set up. A request for a first gesture is presented 1304 to a user, such as displayed on the touchscreen display. The first gesture is identified as gesture (i), where i=1, 2, . . . N, and N is the total number of gestures. Position indicator data (i), corresponding to the gesture (i) is received 1306 and in response a list of actions is displayed 1308, a user may select from the list of actions to associate with gesture (i). A selection of action (i) is received 1310, and associated 1312 with the gesture (i), position indicator data (i), and action (i). The method includes activities to determine 1316 if more gestures are to be set up. If so, the index "i" is incremented and processing returns to request 1304 a next gesture.

Figure 14:
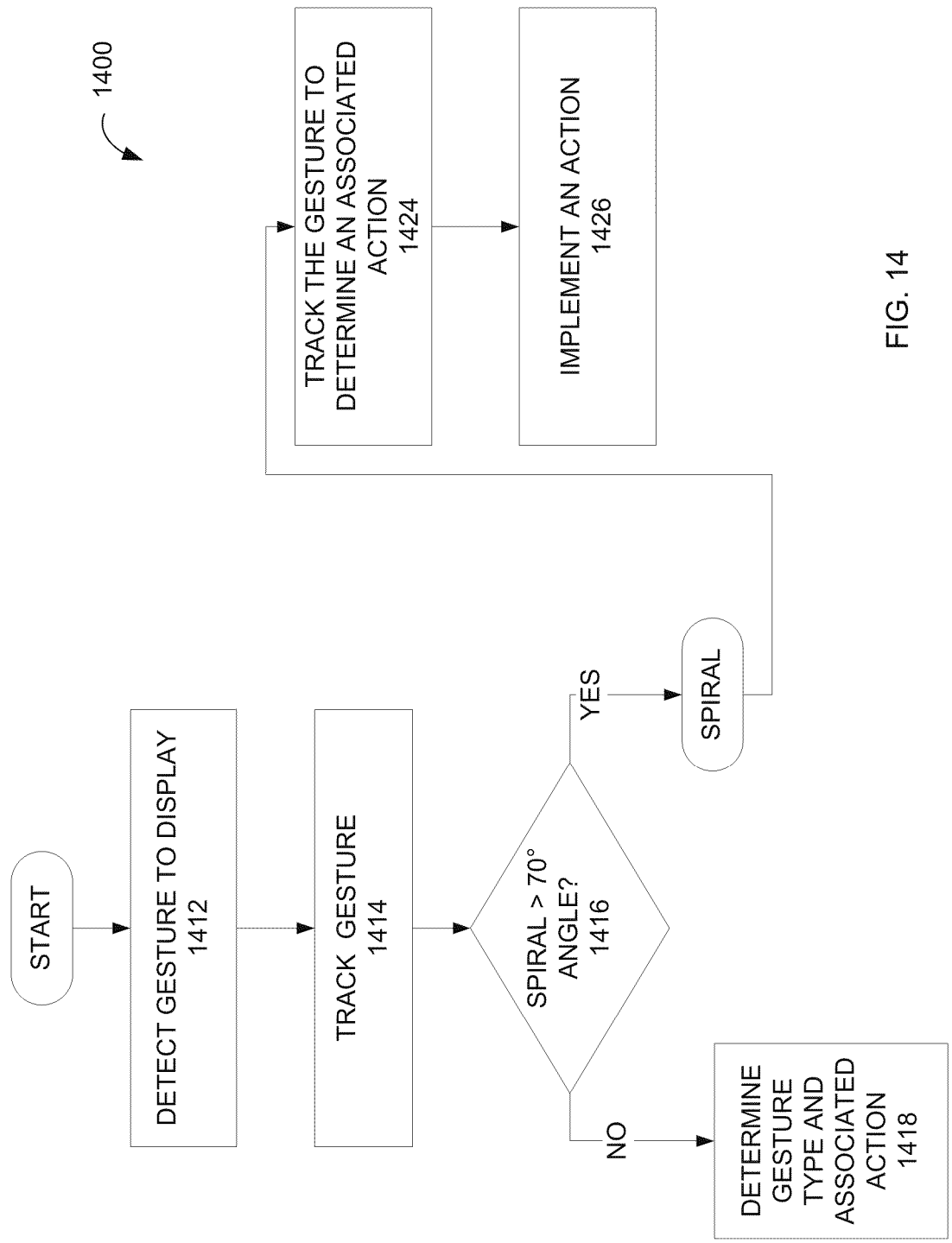
FIG. 14 is a flow diagram illustrating a method to set up a floating origin, according to an example embodiment.

FIG. 14 is a flow diagram illustrating a method for identifying a gesture supporting a single touch zoom control according to some embodiments. The method 1400 includes activities to detect 1412 a gesture to display, and track 1414 the gesture as it is drawn on the display device. A spiral is defined as a gesture having an arc greater than an angular threshold, such as greater than 70°. The angular measurement is made starting at the start point and measured from an axis containing both the start point and the origin. If it is determined 1416 that the gesture is not a spiral, the display device determines 1418 a gesture type and associated action. Some embodiments implement other criteria to determine if the gesture is a spiral. The method 1400 may include activities to determine a floating origin, and to calculate a distance for at least one point of the gesture to the floating origin. The gesture may be tracked 1424 to determine an associated action, and wherein the action is implemented 1426.

Figure 15:
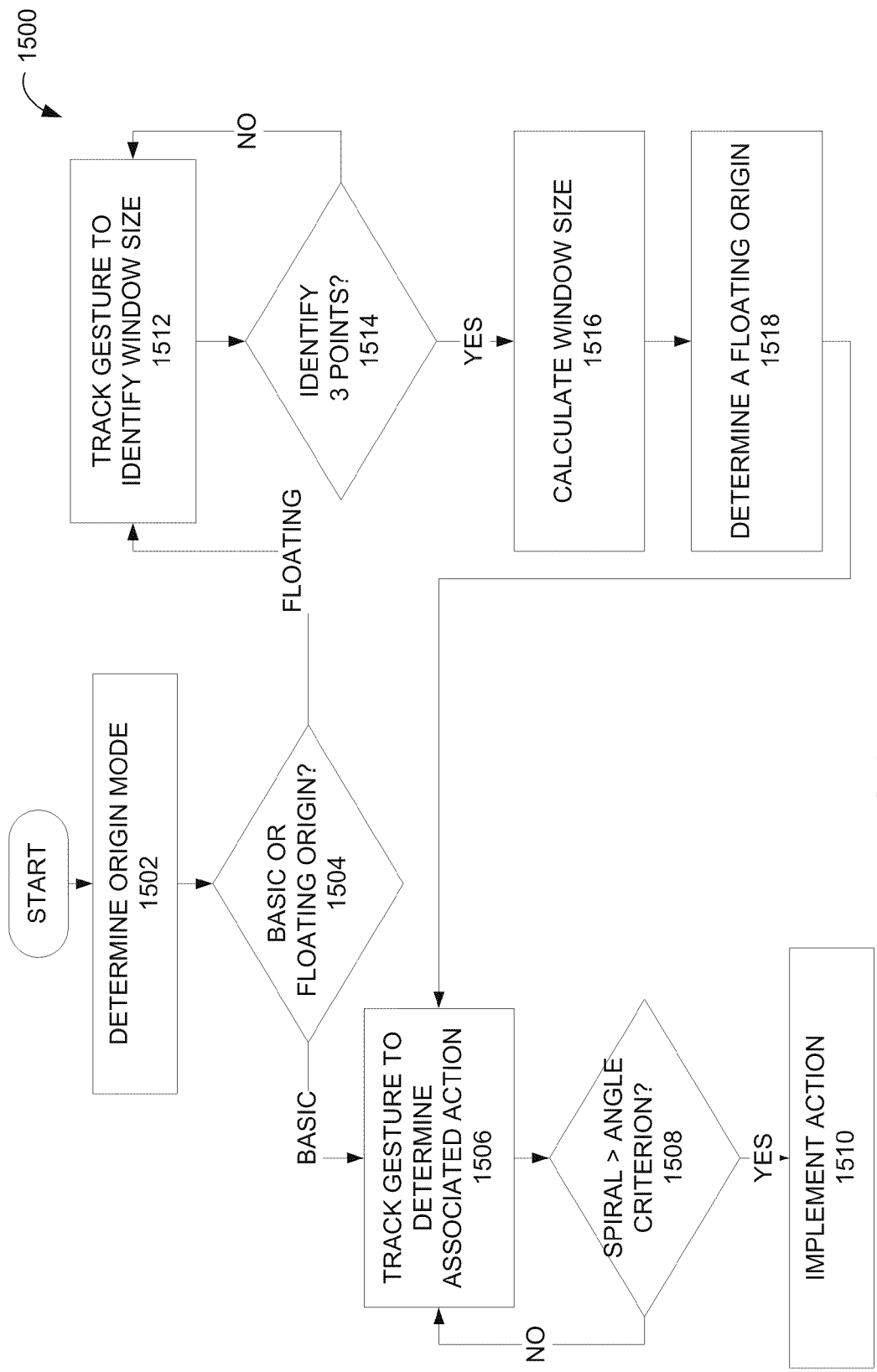
FIG. 15 is a flow diagram illustrating a method to set up a floating origin, according to an example embodiment.

FIG. 15 is a flow diagram illustrating a method 1500 for identifying a gesture supporting a single touch zoom control according to some embodiments. The method 1500 starts by determining 1502 an origin mode to identify the mechanism that selects an origin to evaluate gesture motions. At decision point 1504, it is determined if a basic or stationary predetermined origin will be used, such as a center coordinate of the display screen, or if a floating origin will be used. For a basic origin mode, the origin is defined by predetermined coordinates. These coordinates are used as the origin and the method 1500 may continue to track received gestures. The method 1500 includes activities to track 1506 a gesture to determine an action associated with the gesture. When a gesture is detected, the angle of the gesture with respect to the origin is compared 1508 to an angle criterion. The angle criterion determines whether the gesture is a spiral gesture. For example, the gesture may be to identify a key on the display device, or may be to draw a line connecting elements displayed on the display device. In this way, for a spiral gesture, the gesture will start at one point, S, having a first orientation with respect to the origin, and will stop at another point, F, having a second orientation with respect to the origin. A spiral motion is indicated when the angle created by the gesture from S to F around the origin is greater than the angle criterion, such as for example when the gesture forms a 70° angle. When the spiral or gesture is not greater than the angle criterion, processing continues to track 1506 gestures to determine an associated action.

When a spiral is indicated, the method 1500 includes activities to implement 1510 the associated action. The associated action is determined by comparing a first distance from the origin to the point S with a second distance from the origin to the point F. When the first distance is less than the second distance, the spiral is increasing. When the first distance is greater than the second distance, the spiral is decreasing. Each type of spiral has an associated action. In one example, for an increasing spiral, the associated action is to zoom-out, and for a decreasing spiral, the associated action is to zoom-in. Alternate examples may use an opposite scheme.

Returning to decision point 1504, if the mechanism used to determine an origin is a floating origin method, then the method 1500 includes activities for tracking 1512 a received gesture to identify 1512 a window size. Processing continues to decision point 1514 to identify at least three points to calculate a window size. When three points are identified, S, F and at least one corner point, processing continues to calculate 1516 a window size based on the three points. From the window size, a floating origin is determined 1518 and processing continues to track 1506 gestures using the floating origin. Processing then continues similar to the basic origin determination method. When a user makes a rectangular gesture along an edge of the display screen, this action serves to change the input mode from a floating origin mode (e.g., such as where the user defines an area to zoom) to a basic origin mode (e.g., such as defined by the dimensions of the display screen or positioned at a predetermined position).

Figure 16:
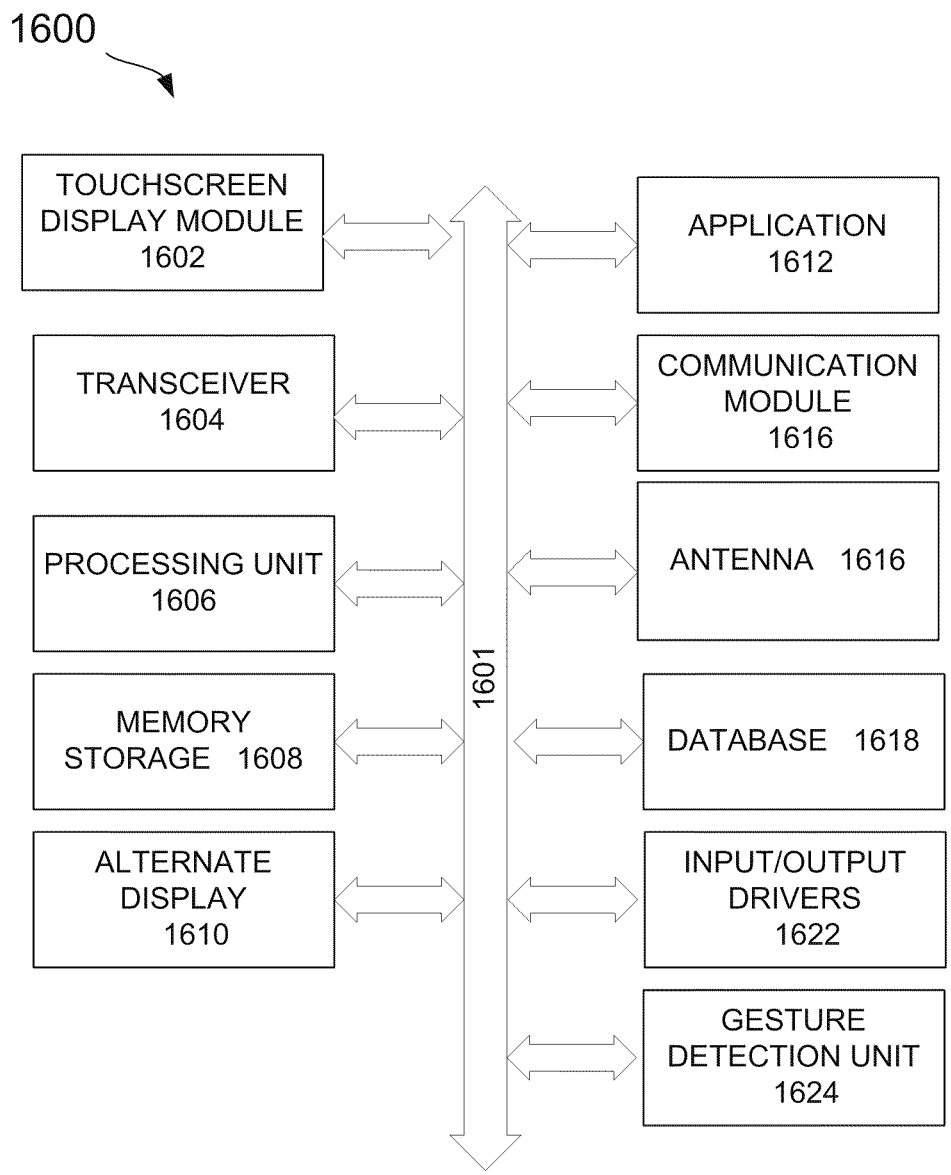
FIG. 16 is a block diagram of a computing system supporting a single touch control technique, according to an example embodiment.

The methods and techniques discussed herein may be implemented in a computing system 1600 as illustrated in FIG. 16. The computing system 1600 includes a touchscreen display module 1602 and a gesture detection unit 1624 to implement the methods and techniques discussed herein. The computing system 1600 includes a transceiver 1604, a processing unit 1606, a memory storage unit 1608. The processing unit is to control operation of the computing system 1600 and the components such as the touchscreen display module 1602 and gesture detection unit 1624. The transceiver 1604 communicates through the antenna 1616 and a communication module 1614 which implements a communication protocol. The computing system 1600 further includes application 1612 to store program, application and service interfaces for the computing system 1600. A database 1618 may be implemented to store data and other information for easy storage and access. Input/output drivers 1622 are provided to interface with modules external to the computing system 1600. An alternate display 1610 is optionally provided, such as to have a non-touch display screen in coordination with the touchscreen display module 1602. The touchscreen display module 1602 is as module 1000 of FIG. 10, having a gesture detect unit, similar to gesture detect unit 1090, and a controller, similar to controller 1040.

The computing system 1600 includes memory storage 1608, which may include portions of Random Access Memory (RAM), Read-Only Memory (ROM), Erasable Programmable ROM (EPROM) & Electrically Erasable Programmable ROM (EEPROM), flash memory or other memory technologies. The memory storage 1608 may further include Compact Disc ROM (CD ROM), Digital Versatile Disks (DVD) or other type of optical disk storage, magnetic cassettes, magnetic tape, magnetic disk storage or other magnetic storage devices, or any other medium capable of storing computer-readable instructions. Computing system 1600 may operate in a networked environment using a communication connection to connect to one or more remote computers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 1606. A hard drive, CD-ROM, and RAM are some examples of articles including a computer-readable medium.

Figure 17:
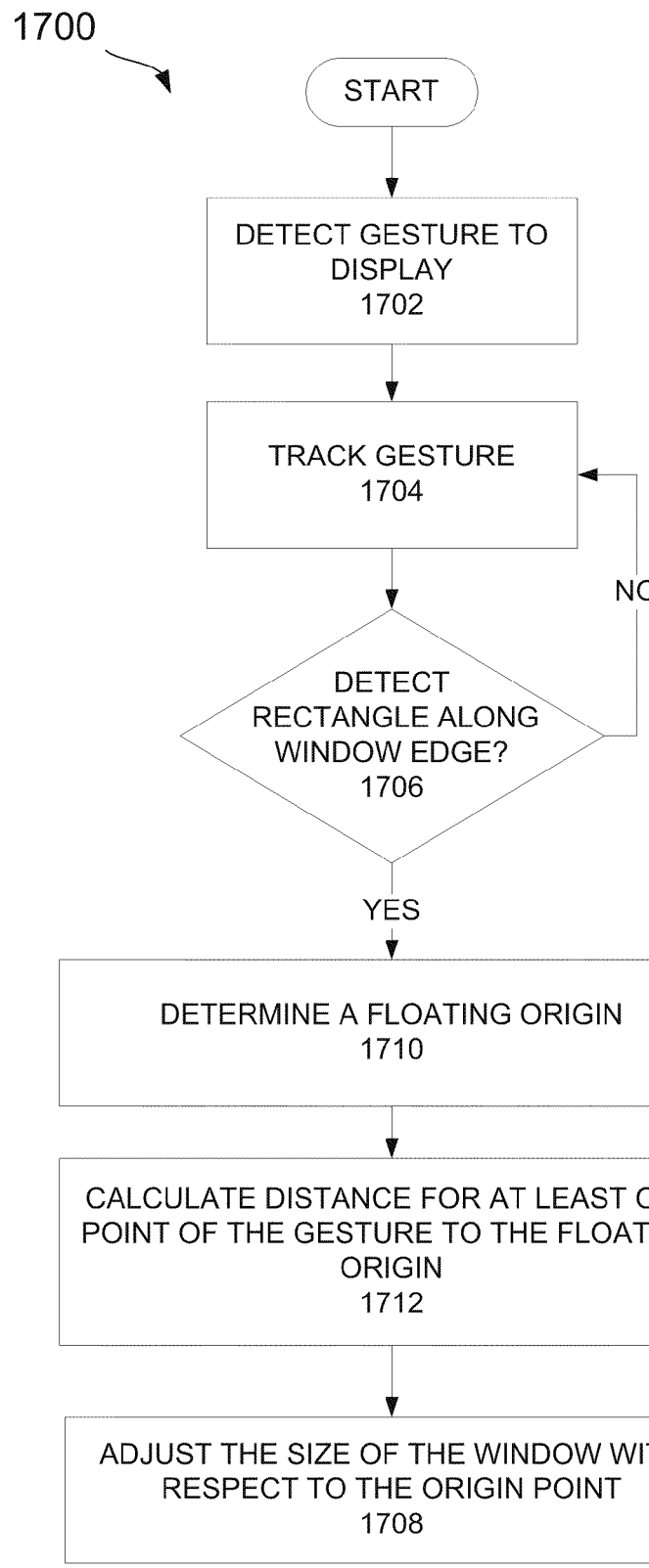
FIG. 17 is a flow diagram illustrating a method to set up a floating origin, according to an example embodiment.

FIG. 17 illustrates an example embodiment of a method 1700 where a system detects 1702 a gesture made to a display device and then tracks 1704 the gesture. At decision point 1706 the system detects a rectangle along a window edge. The window edge identifying a portion of the display screen of the display device, such as illustrated by window 1802 of FIG. 18. Continuing with FIG. 17, the method 1700 may further include activities to determine 1710 a floating origin within the window defined by the window edge, and to calculate a distance from at least one point on the gesture to the floating origin. The system then adjusts 1708 the size of the window with respect to the origin point.

Figure 18:
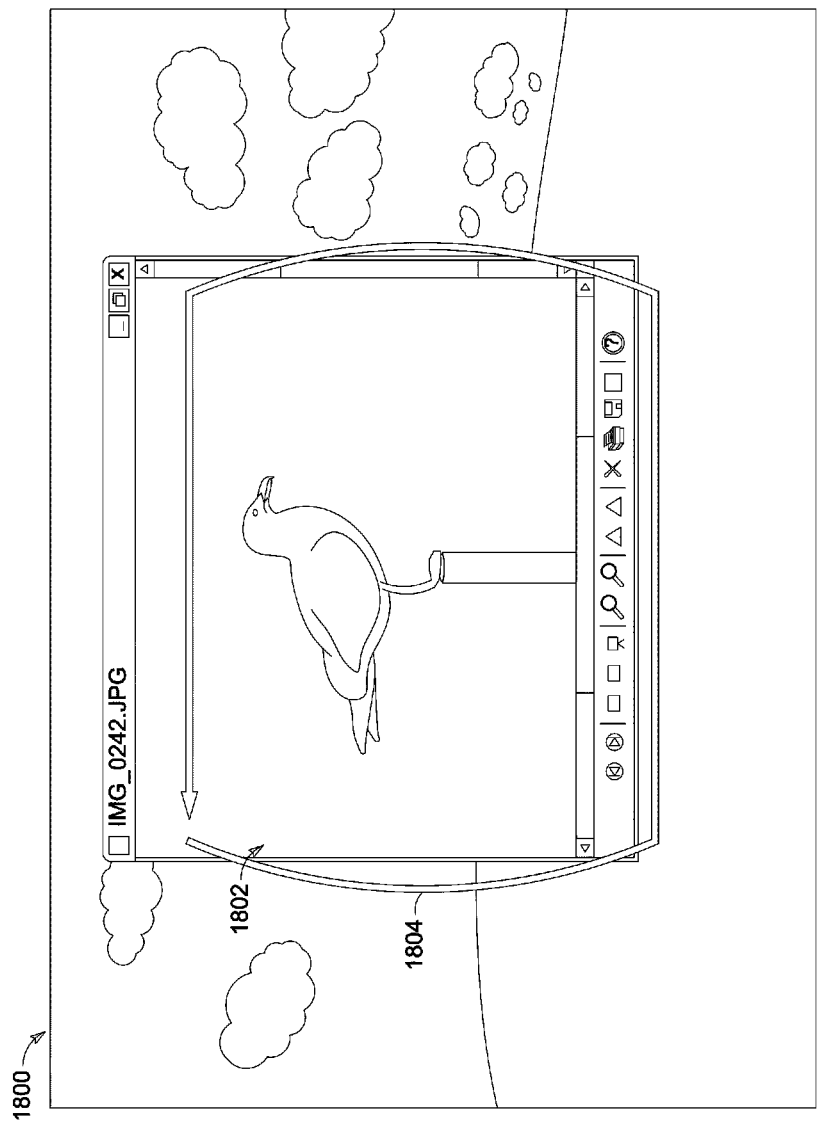
FIGS. 18-21 illustrate a display device implementing a method, according to an example embodiment.
Figure 19:
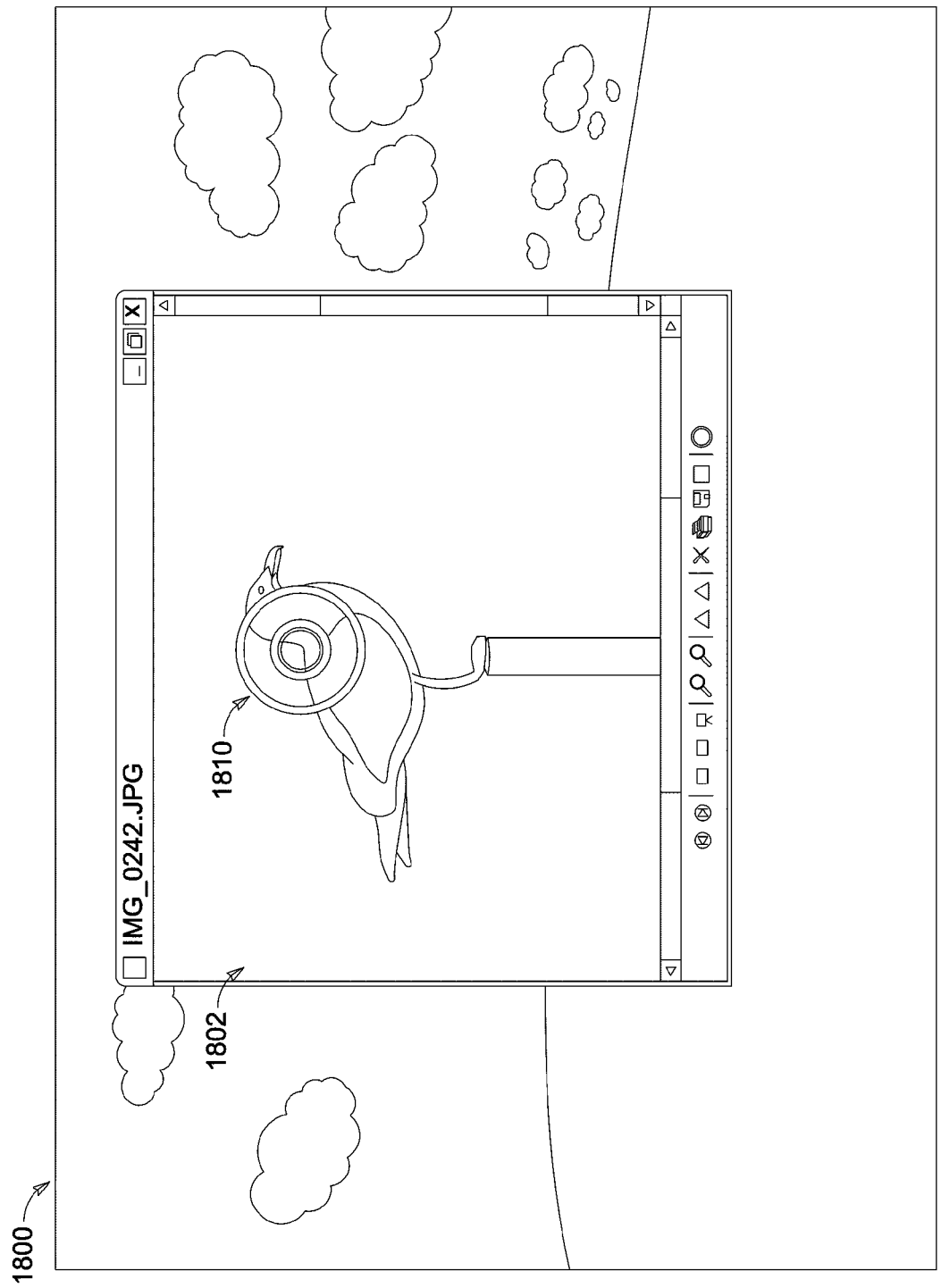
Figure 20:
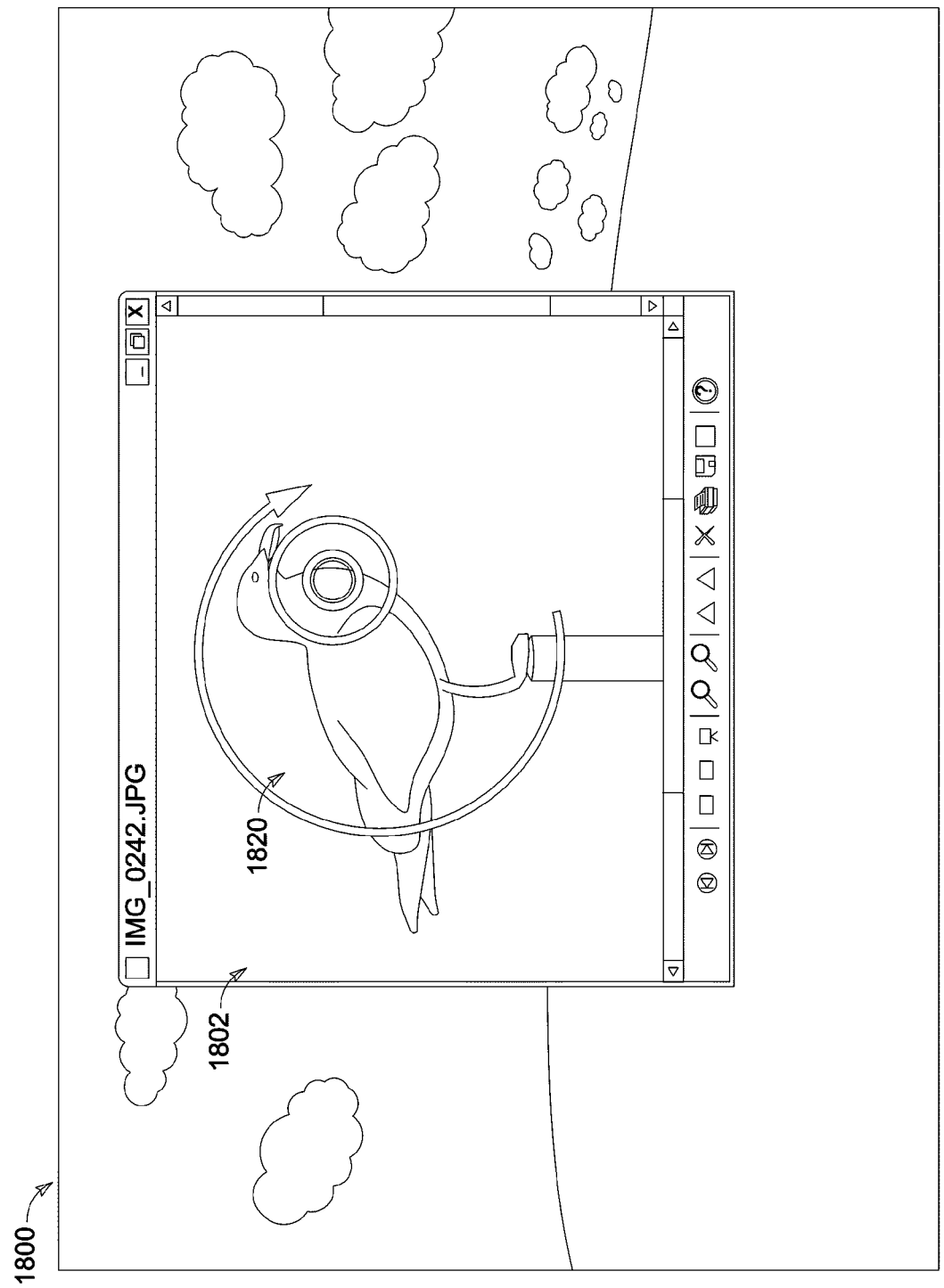

An example is illustrated in FIGS. 18, 19 and 20, wherein a display device has a display screen 1800. A window 1802 is displayed within the display screen 1800. A gesture is made to form a line 1804 that defines the window 1802. In the illustrated example, the window 1802 is a displayed window or object distinct from the background or other display on display screen 1800, however, some embodiments allow definition of a window that is a part of the background or other display. For example, a gesture may be made to form a line that defines a window that is smaller than the window 1802 or larger than the window 1802.

In response to the gesture forming line 1804 of FIG. 18, a floating origin 1810 is determined as illustrated in FIG. 19. The floating origin acts as the origin for any adjustment in the size of the defined window, and specifically defines the origin for magnifying the window 1802 or reducing the size of the window 1802. As illustrated in FIG. 20, once the floating origin is determined, the system may receive a gesture indication defining a spiral line 1820. In response to the direction, placement and shape of the spiral line 1820, the system determines the action to implement. As illustrated, a distance from the spiral line 1820 to the origin is decreasing, which indicates a magnification operation in one embodiment. Some embodiments may have action schemes which are different from the examples provided, and may allow a user to set the actions associated with different gestures.

As described, a touchscreen display device implements a single touch operation using a spiral rotation gesture on a touchscreen display device to magnify the display of an image, wherein continued spiral rotations result in continued magnification. A zoom-in or zoom-out operation is implemented by a single touch spiral rotation. In one example, a spiral rotation defining an increasing area has a corresponding action to reduce a portion of the display screen. Similarly, a spiral rotation defining a decreasing area corresponds to magnification of the portion of the display screen. A floating origin may be used to identify gestures at various positions on a touchscreen display.

Figure 21:
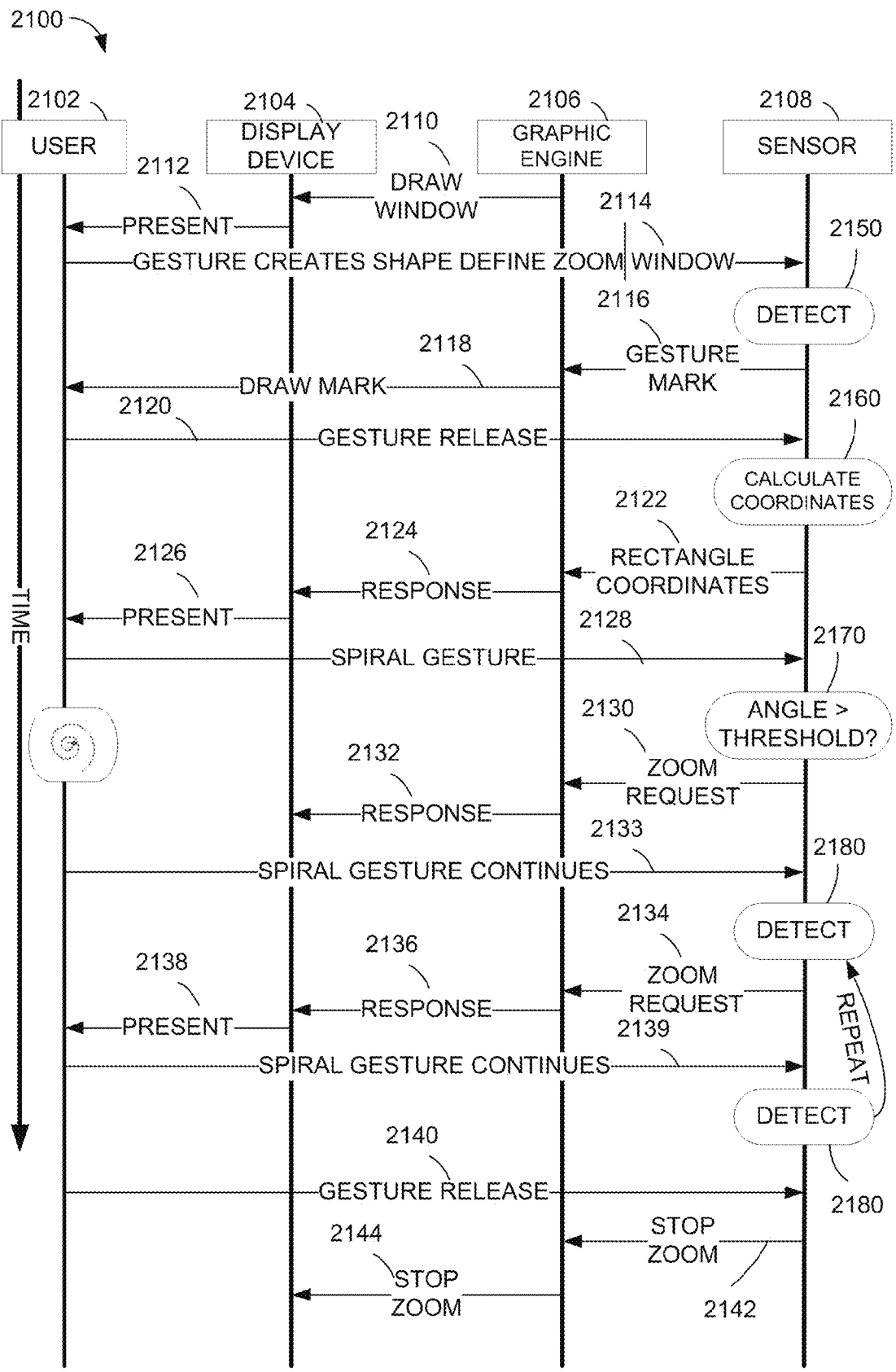

FIG. 21 illustrates a timing diagram of a method 2100 to implement a floating point origin method of single touch operation. The method 2100 is illustrated with respect to time on a vertical axis. The interactions of the example are among a user 2102, a display device 2104, a graphic engine 2106 for providing display content to the display device 2104, and a position sensor 2108.

The method 2100 initializes the display where the graphic engine 2106 draws 2110 a window to be displayed on the display device 2104. The display device 2104 then presents 2112 the window, which is viewable by a user 2102. The user 2102 applies a touch to the display device 2104 as a gesture creating a shape 2114, such as a rectangle or other shape, to define a zoom window. The gesture is received by the sensor 2108, which detects 2150 the gesture and sends the graphic information defining the zoom window 2116 to the graphic engine 2106, which then draws the zoom window 2118 on the display device 2104. The gesture terminates and the user releases the gesture 2120. In response to release of the gesture, the sensor 2108 calculates 2160 the coordinates of the zoom window. The rectangular coordinates are provided to the graphic engine 2106, which provides the information 2122 for display on the display device 2104. The zoom window may be viewable by the user 2102 to identify the zoomable area is on the display device 2104 that will be subject to the zoom action, such as where the zoom window is blinking or otherwise indicated on the display device 2104. After the zoom window is set, the user may apply 2128 another gesture to the display device 2104 as a spiral gesture. The sensor 2108 receives the spiral gesture and calculates an angle of the spiral. When the spiral angle is greater than a threshold angular value 2170, the sensor 2108 interprets the spiral gesture as a zoom request. In one example, the threshold angular value 2170 is approximately equal to an angular measure of 70°. The sensor 2108 then sends the zoom request 2130 to the graphic engine with an indication of what action is to be taken. The graphic engine 2106 responds 2132 and provides information to the display device 2104.

As the user continues the spiral gesture 2133, the gesture is detected 2180 by the sensor 2108 and an iterative loop begins. The sensor 2108 sends the zoom request information 2134 to the graphic engine 2106, which sends 2136 the response information to perform the action on the zoom window of display device 2104 to the display device 2104. The action is performed on the zoom window and presented 2138 on the display device 2104. As the spiral gesture continues 2139, the method 2100 continues to detect 2180 the spiral gesture and continues to perform the zoom action on the zoom window displayed. When the user releases the gesture 2140, the sensor 2108 sends an instruction to terminate or stop the zoom action 2142 to the graphic engine 2106. The graphic engine 2106 sends information, such as control information or instructions, to the display device 2104 to terminate the zoom action.

Some embodiments may provide the steps in a different order, or may include other elements in a display system. The sensor 2108 may be a capacitive touch sensor, a resistive touch sensor or other type of position sensor that is responsive to a touch to a display device. The display device in some embodiments incorporates a touch screen device having driving and sensing layers to recognize touches. The touch screen device may be configured to recognize a human touch, an object's touch or other indication of a gesture on the touch screen device.

Some embodiments may incorporate a zoom window that is a rectangle, square or other shape. Still further, the graphic engine may be designed to allow a user to configure the various gestures and responsive actions. For example, the user may assign an increasing spiral to zoom in or to zoom-out. Other embodiments may include other actions in addition to, or in place of, the magnification and reduction actions of the present examples.

The invention claimed is:

1. A method comprising:
 identifying, using at least one processor, an origin on a display device;
 detecting, using the at least one processor, a gesture on the display device at a first location;
 determining, using the at least one processor, a first distance from the origin to the first location;
 tracking, using the at least one processor, movement of the gesture from the first location to a second location;
 determining, using the at least one processor, a second distance from the origin to the second location; and
 determining, using the at least one processor, an action associated with the gesture based on the movement of the gesture and a comparison of the first and second distances;
 wherein:
  the gesture defines a circular area centered at the origin; and
  the action comprises:
   reducing an image displayed on the display device when the movement of the gesture defines an increasing circular area; and
   magnifying the image displayed on the display device when the movement of the gesture defines a decreasing circular area.

2. The method of claim 1, wherein:
 magnifying the image displayed on the display device when the movement of the gesture defines a decreasing circular area comprises magnifying the image displayed on the display device when the first distance is greater than the second distance; and
 reducing the image displayed on the display device when the movement of the gesture defines an increasing circular area comprises reducing the image displayed on the display device when the first distance is less than the second distance.

3. The method of claim 1, further comprising: detecting a spiral rotation when an angle formed by a first radial line from the origin to a start point of the gesture and a second radial line from the origin to an end point of the gesture is greater than a threshold angular value.

4. The method of claim 1, wherein the origin is a floating origin.

5. The method of claim 1, wherein:
 the gesture is a first gesture;
 the action is a first action; and
 the method further comprises:
  initiating a set up procedure to associate gestures with associated magnification actions;
  detecting a second gesture;
  presenting a list of associated magnification actions on the display device;
  receiving a user selection of a second action; and
  associating the gesture with the second action.

6. An apparatus, comprising:
 a touch sensor configured to detect a gesture at a first location; and
 one or more non-transitory electronic storage media comprising instructions that, when executed, are configured to:
 identify an origin;
 determine a first distance from the origin to the first location;
 track movement of the gesture from the first location to a second location;
 determine a second distance from the origin to the second location; and
 determine an action associated with the gesture based on the movement of the gesture and a comparison of the first and second distances;
 wherein:
  the gesture defines a circular area centered at the origin; and
  the action comprises:
   reducing an image displayed on the apparatus when the movement of the gesture defines an increasing circular area; and
   magnifying the image displayed on the apparatus when the movement of the gesture defines a decreasing circular area.

7. The apparatus of claim 6, wherein:
 magnifying the image displayed on the apparatus when the movement of the gesture defines a decreasing circular area comprises magnifying the image displayed on the display device when the first distance is greater than the second distance; and
 reducing the image displayed on the apparatus when the movement of the gesture defines an increasing circular area comprises reducing the image displayed on the display device when the first distance is less than the second distance.

8. The apparatus of claim 6, wherein the instructions are further configured to:
 detect a spiral rotation when an angle formed by a first radial line from the origin to a start point of the gesture and a second radial line from the origin to an end point of the gesture is greater than a threshold angular value.

9. The apparatus of claim 6, wherein the origin is a floating origin.

10. The apparatus of claim 6, wherein:
 the gesture is a first gesture;
 the action is a first action; and the instructions are further configured to:
    initiate a set up procedure to associate gestures with associated magnification actions;
    detect a second gesture;
    present a list of associated magnification actions on the apparatus;
    receive a user selection of a second action; and
    associating the gesture with the second action.

11. A machine-readable non-transitory medium storing instructions that, when executed by at least one processor, are configured to
    identify an origin on a display device;
    detect a gesture on the display device at a first location;
    determine a first distance from the origin to the first location;
    track movement of the gesture from the first location to a second location;
    determine a second distance from the origin to the second location; and
    determine an action associated with the gesture based on the movement of the gesture and a comparison of the first and second distances;
    wherein:
        the gesture defines a circular area centered at the origin; and
        the action comprises:
            reducing an image displayed on the display device when the movement of the gesture defines an increasing circular area; and
            magnifying the image displayed on the display device when the movement of the gesture defines a decreasing circular area.

12. The medium of claim 11 wherein the origin is a floating origin.

13. The medium of claim 11, wherein the instructions, when executed by the at least one processor, are further configured to:
    identify a spiral rotation when the gesture defines an angular measure above a threshold value, wherein the angular measure is measured from a radial line defined by the first location and the origin.

14. The medium of claim 11, wherein the action comprises:
    magnifying an image displayed on the display device when the movement of the gesture defines a decreasing circular area comprises magnifying the image displayed on the display device when the first distance is greater than the second distance; and
    reducing the image displayed on the display device when the movement of the gesture defines an increasing circular area comprises reducing the image displayed on the display device when the first distance is less than the second distance.

15. The medium of claim 11, wherein:
    the gesture is a first gesture;
    the action is a first action; and
    the instructions, when executed by the at least one processor, are further configured to:
        initiate a set up procedure to associate gestures with associated magnification actions;
    detect a second gesture;
    present a list of associated magnification actions on the display device;
    receive a user selection of a second action; and
    associating the gesture with the second action.

* * * * *